United States Patent
Weng et al.

(10) Patent No.: US 12,210,200 B2
(45) Date of Patent: Jan. 28, 2025

(54) PHOTONIC SEMICONDUCTOR DEVICE AND METHOD OF MANUFACTURE

(71) Applicant: Taiwan Semiconductor Manufacturing Co., Ltd., Hsinchu (TW)

(72) Inventors: Chung-Ming Weng, Hsinchu (TW); Chen-Hua Yu, Hsinchu (TW); Chung-Shi Liu, Hsinchu (TW); Hao-Yi Tsai, Hsinchu (TW); Cheng-Chieh Hsieh, Tainan (TW); Hung-Yi Kuo, Taipei (TW); Tsung-Yuan Yu, Taipei (TW); Hua-Kuei Lin, Hsinchu (TW); Che-Hsiang Hsu, Taichung (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 18/586,919

(22) Filed: Feb. 26, 2024

(65) Prior Publication Data

US 2024/0192456 A1 Jun. 13, 2024

Related U.S. Application Data

(63) Continuation of application No. 18/312,767, filed on May 5, 2023, now Pat. No. 11,947,173, which is a continuation of application No. 17/567,497, filed on Jan. 3, 2022, now Pat. No. 11,686,908.

(60) Provisional application No. 63/264,191, filed on Nov. 17, 2021.

(51) Int. Cl.
*G02B 6/43* (2006.01)
*G02B 6/42* (2006.01)

(52) U.S. Cl.
CPC ............ *G02B 6/43* (2013.01); *G02B 6/4204* (2013.01); *G02B 6/4214* (2013.01); *G02B 6/4239* (2013.01); *G02B 6/4253* (2013.01)

(58) Field of Classification Search
None
See application file for complete search history.

(56) References Cited

U.S. PATENT DOCUMENTS

| | | | |
|---|---|---|---|
| 9,285,554 B2 * | 3/2016 | Doany | G02B 6/32 |
| 10,267,988 B2 * | 4/2019 | Huang | G02B 6/43 |
| 11,482,649 B2 * | 10/2022 | Chen | H01L 33/58 |
| 11,506,843 B1 * | 11/2022 | Weng | G02B 6/4204 |
| 2013/0209026 A1 * | 8/2013 | Doany | G02B 6/32 |
| | | | 438/32 |
| 2017/0131469 A1 * | 5/2017 | Kobrinsky | G02B 6/4257 |
| 2019/0004247 A1 * | 1/2019 | Huang | G02B 6/4214 |

(Continued)

*Primary Examiner* — Jerry Rahll
(74) *Attorney, Agent, or Firm* — Slater Matsil, LLP

(57) ABSTRACT

A package includes a photonic layer on a substrate, the photonic layer including a silicon waveguide coupled to a grating coupler; an interconnect structure over the photonic layer; an electronic die and a first dielectric layer over the interconnect structure, where the electronic die is connected to the interconnect structure; a first substrate bonded to the electronic die and the first dielectric layer; a socket attached to a top surface of the first substrate; and a fiber holder coupled to the first substrate through the socket, where the fiber holder includes a prism that re-orients an optical path of an optical signal.

20 Claims, 20 Drawing Sheets

(56) References Cited

U.S. PATENT DOCUMENTS

2021/0132309 A1* 5/2021 Zhang ................... H01L 24/20
2022/0037566 A1* 2/2022 Chen ................ H01L 31/02325

* cited by examiner

PHOTONIC SEMICONDUCTOR DEVICE AND METHOD OF MANUFACTURE

PRIORITY CLAIM AND CROSS-REFERENCE

This application is a continuation of U.S. application Ser. No. 18/312,767, filed May 5, 2023, which is a continuation of U.S. application Ser. No. 17/567,497, filed on Jan. 3, 2022, now U.S. Pat. No. 11,686,908, issued on Jun. 27, 2023, which claims the benefit of U.S. Provisional Application No. 63/264,191, filed on Nov. 17, 2021, which applications are hereby incorporated herein by reference.

BACKGROUND

Electrical signaling and processing are one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating optical components and electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
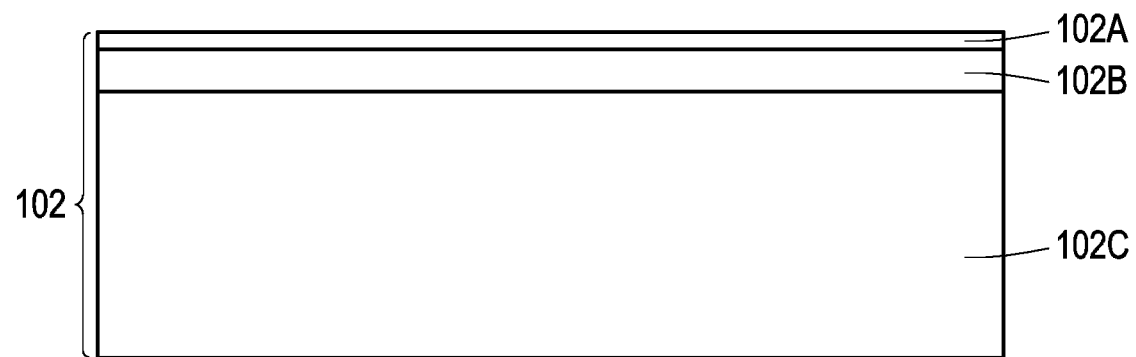
FIGS. 1 through 13C illustrate cross-sectional views of intermediate steps of forming a photonic package, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Various embodiments provide methods of forming a package that includes both optical devices and electrical devices. In particular, the package includes one or more waveguides. A dielectric layer is formed over the waveguides and a support substrate is bonded to the dielectric layer. A separable fiber attachment and a polymer micro lens are formed on top of the support substrate. The separable fiber attachment includes a prism and the separable fiber attachment enables optical communication between optical fibers connected to the separable fiber attachment and one or more grating couplers formed in the waveguides. Advantageous features of one or more embodiments disclosed herein may include the use of the lateral separable fiber attachment which supports a re-orientation (e.g., vertically turning) of the optical path while still maintaining robustness of the optical fiber with a lower susceptibility to optical fiber breakage, and better tolerance and protection from particles falling on the polymer micro lens which may negatively affect optical communication. In addition, a wafer level process can be used to form the polymer micro lens that utilizes lithography that allows for higher throughput and alignment accuracy when forming the polymer micro lens. Further, the use of the polymer micro lens and the prism and its topography allows for improved alignment of the optical path by allowing adjustments to be easily made to the optical path. Also, the use of the polymer micro lens results in reduced alignment tolerances and a better spot size conversion with improved throughput (e.g., allowing for optical signals with larger wavelengths), which enables the package to be used in a broader range of applications such as virtual reality and augmented reality that require the ability to transmit optical signals that have larger wavelengths.

FIGS. 1 through 13C show cross-sectional views of intermediate steps of forming photonic packages 100, in accordance with some embodiments. FIGS. 13D through 15C show cross-sectional views of intermediate steps of forming photonic packages 200/300/400, in accordance with alternate embodiments. In some embodiments, the photonic packages 100/200/300/400 may act as an input/output (I/O) interface between optical signals and electrical signals in a photonic system. For example, one or more photonic packages 100/200/300/400 may be used in a photonic system such as the photonic system 500 (see FIG. 16), the like, or another photonic system.

Turning first to FIG. 1, a buried oxide ("BOX") substrate 102 is provided, in accordance with some embodiments. The BOX substrate 102 includes an oxide layer 102B formed over a substrate 102C, and a silicon layer 102A formed over the oxide layer 102B. The substrate 102C may be, for example, a material such as a glass, ceramic, dielectric, a semiconductor, the like, or a combination thereof. In some embodiments, the substrate 102C may be a semiconductor substrate, such as a bulk semiconductor or the like, which may be doped (e.g., with a p-type or an n-type dopant) or undoped. The substrate 102C may be a wafer, such as a silicon wafer (e.g., a 12-inch silicon wafer). Other substrates, such as a multi-layered or gradient substrate may also be used. In some embodiments, the semiconductor material of the substrate 102C may include silicon; germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. The oxide layer 102B may be, for example, a silicon oxide or the like. The BOX substrate 102 may be referred to as having a front side or front surface (e.g., the side facing upwards in FIG. 1), and a back side or back surface (e.g., the side facing downwards in FIG. 1).

Figure 2:
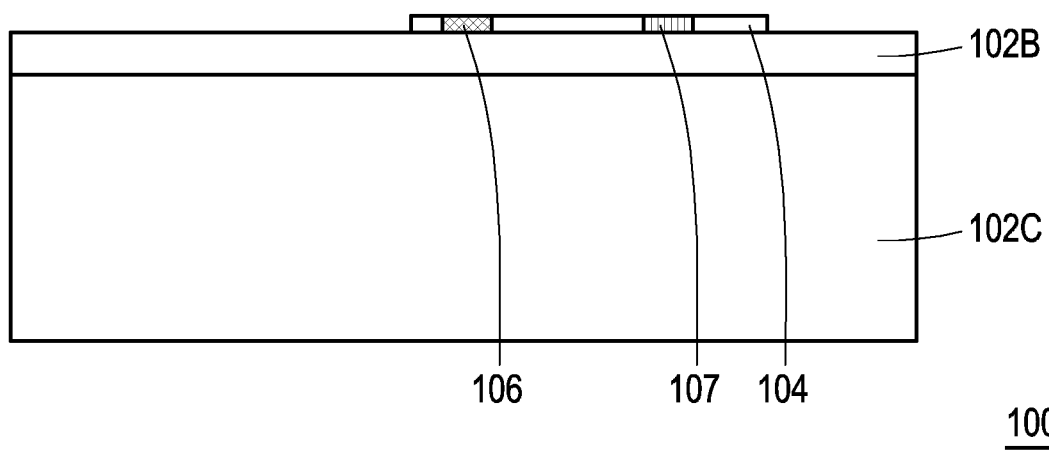

In FIG. 2, the silicon layer 102A is patterned to form silicon regions for waveguides 104, photonic components 106, and/or couplers 107, in accordance with some embodiments. The silicon layer 102A may be patterned using suitable photolithography and etching techniques. For example, a hardmask layer (e.g., a nitride layer or other dielectric material, not shown in FIG. 2) may be formed over the silicon layer 102A and patterned, in some embodiments. The pattern of the hardmask layer may then be transferred to the silicon layer 102A using one or more etching techniques, such as dry etching and/or wet etching techniques. For example, the silicon layer 102A may be etched to form recesses defining the waveguides 104, with sidewalls of the remaining unrecessed portions defining sidewalls of the waveguides 104. In some embodiments, more than one photolithography and etching sequence may be used in order to pattern the silicon layer 102A. One waveguide 104 or multiple waveguides 104 may be patterned from the silicon layer 102A. If multiple waveguides 104 are formed, the multiple waveguides 104 may be individual separate waveguides 104 or connected as a single continuous structure. In some embodiments, one or more of the waveguides 104 form a continuous loop. Other configurations or arrangements of waveguides 104, the photonic components 106, or the couplers 107 are possible. In some cases, the waveguides 104, the photonic components 106, and the couplers 107 may be collectively referred to as "the photonic layer."

The photonic components 106 may be integrated with the waveguides 104, and may be formed with the silicon waveguides 104. The photonic components 106 may be optically coupled to the waveguides 104 to interact with optical signals within the waveguides 104. The photonic components 106 may include, for example, photodetectors and/or modulators. For example, a photodetector may be optically coupled to the waveguides 104 to detect optical signals within the waveguides 104 and generate electrical signals corresponding to the optical signals. A modulator may be optically coupled to the waveguides 104 to receive electrical signals and generate corresponding optical signals within the waveguides 104 by modulating optical power within the waveguides 104. In this manner, the photonic components 106 facilitate the input/output (I/O) of optical signals to and from the waveguides 104. In other embodiments, the photonic components may include other active or passive components, such as laser diodes, optical signal splitters, or other types of photonic structures or devices. Optical power may be provided to the waveguides 104 by, for example, an optical fiber 150 (see FIGS. 13C, 13D, 14D and 15C) coupled to an external light source, or the optical power may be generated by a photonic component within the photonic package 100/200/300/400 such as a laser diode (not shown in the figures).

In some embodiments, the photodetectors may be formed by, for example, partially etching regions of the waveguides 104 and growing an epitaxial material on the remaining silicon of the etched regions. The waveguides 104 may be etched using acceptable photolithography and etching techniques. The epitaxial material may comprise, for example, a semiconductor material such as germanium (Ge), which may be doped or undoped. In some embodiments, an implantation process may be performed to introduce dopants within the silicon of the etched regions as part of the formation of the photodetectors. The silicon of the etched regions may be doped with p-type dopants, n-type dopants, or a combination. In some embodiments, the modulators may be formed by, for example, partially etching regions of the waveguides 104 and then implanting appropriate dopants within the remaining silicon of the etched regions. The waveguides 104 may be etched using acceptable photolithography and etching techniques. In some embodiments, the etched regions used for the photodetectors and the etched regions used for the modulators may be formed using one or more of the same photolithography or etching steps. The silicon of the etched regions may be doped with p-type dopants, n-type dopants, or a combination. In some embodiments, the etched regions used for the photodetectors and the etched regions used for the modulators may be implanted using one or more of the same implantation steps.

In some embodiments, one or more couplers 107 may be integrated with the waveguides 104, and may be formed with the waveguides 104. The couplers 107 are photonic structures that allow optical signals and/or optical power to be transferred between the waveguides 104 and a photonic component such as an optical fiber 150 or a waveguide of another photonic system.

In some embodiments, the couplers 107 include grating couplers, which allow optical signals and/or optical power to be transferred between the waveguides 104 and a photonic component that is vertically mounted over the photonic package 100. A photonic package 100 may include a single coupler 107, multiple couplers 107, or multiple types of couplers 107, in some embodiments. The couplers 107 may be formed using acceptable photolithography and etching techniques. In some embodiments, the couplers 107 are formed using the same photolithography or etching steps as the waveguides 104 and/or the photonic components 106. In other embodiments, the couplers 107 are formed after the waveguides 104 and/or the photonic components 106 are formed.

Figure 3:
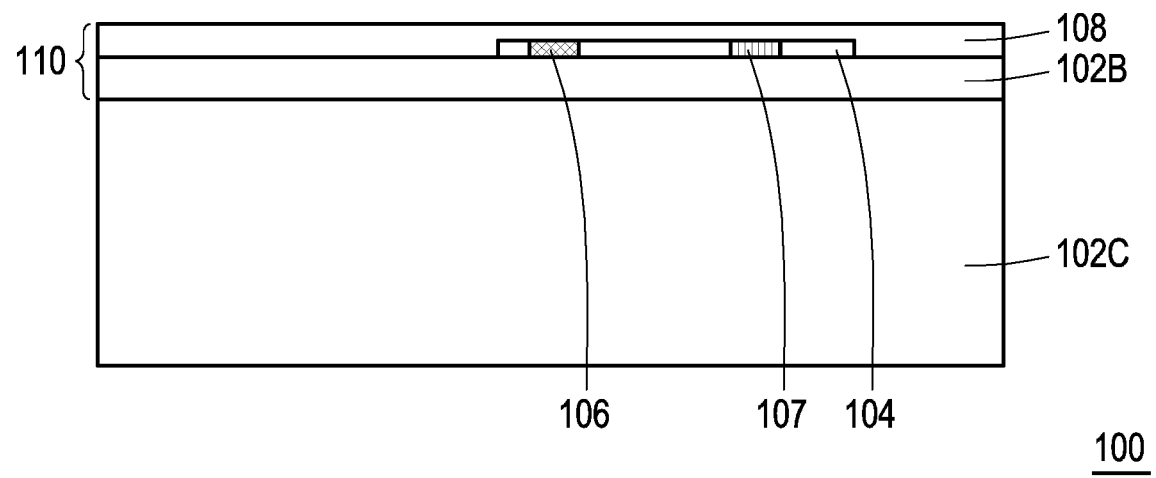

In FIG. 3, a dielectric layer 108 is formed on the front side of the BOX substrate 102 to form a photonic routing structure 110, in accordance with some embodiments. The dielectric layer 108 is formed over the waveguides 104, the photonic components 106, the couplers 107, and the oxide layer 102B. The dielectric layer 108 may be formed of one or more layers of silicon oxide, silicon nitride, a combination thereof, or the like, and may be formed by CVD, PVD, atomic layer deposition (ALD), a spin-on-dielectric process, the like, or a combination thereof. In some embodiments, the dielectric layer 108 may be formed by a high density plasma chemical vapor deposition (HDP-CVD), a flowable CVD (FCVD), the like, or a combination thereof. Other dielectric materials formed by any acceptable process may be used. In some embodiments, the dielectric layer 108 is then planarized using a planarization process such as a CMP process, a grinding process, or the like.

Due to the difference in refractive indices of the materials of the waveguides 104 and dielectric layer 108, the waveguides 104 have high internal reflections such that light is substantially confined within the waveguides 104, depending on the wavelength of the light and the refractive indices of the respective materials. In an embodiment, the refractive index of the material of the waveguides 104 is higher than the refractive index of the material of the dielectric layer 108. For example, the waveguides 104 may comprise silicon, and the dielectric layer 108 may comprise silicon oxide and/or silicon nitride.

Figure 4:
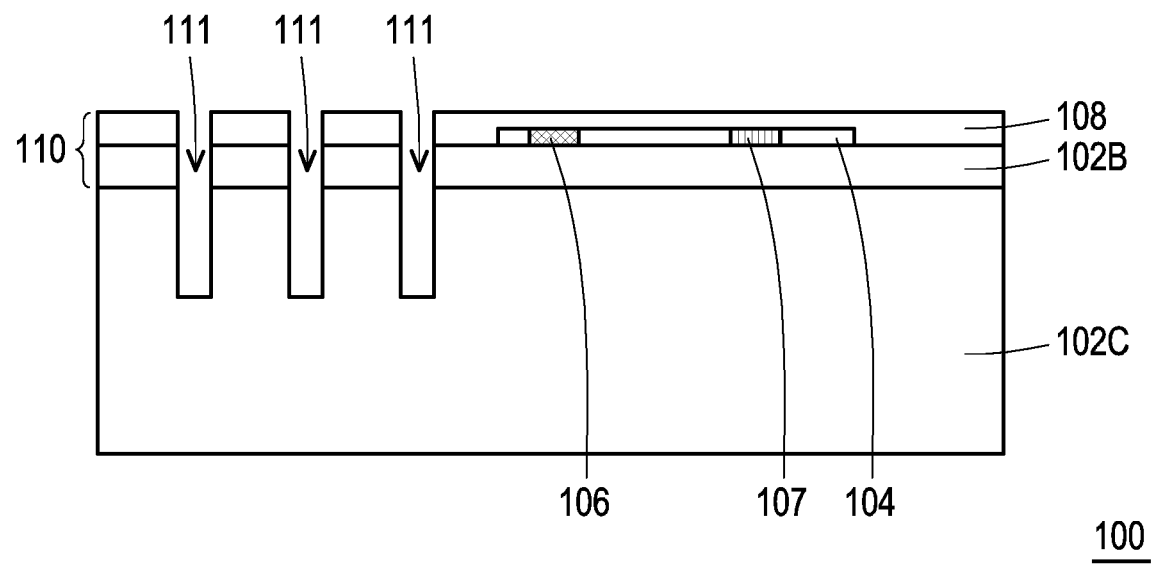

In FIG. 4, openings 111 are formed extending into the substrate 102C, in accordance with some embodiments. The openings 111 are formed extending through the dielectric layer 108 and the oxide layer 102B, and may extend partially into the substrate 102C. The openings 111 may be formed by acceptable photolithography and etching techniques, such as by forming and patterning a photoresist and then performing an etching process using the patterned photoresist as an etching mask. The etching process may include, for example, a dry etching process and/or a wet etching process.

Figure 5:
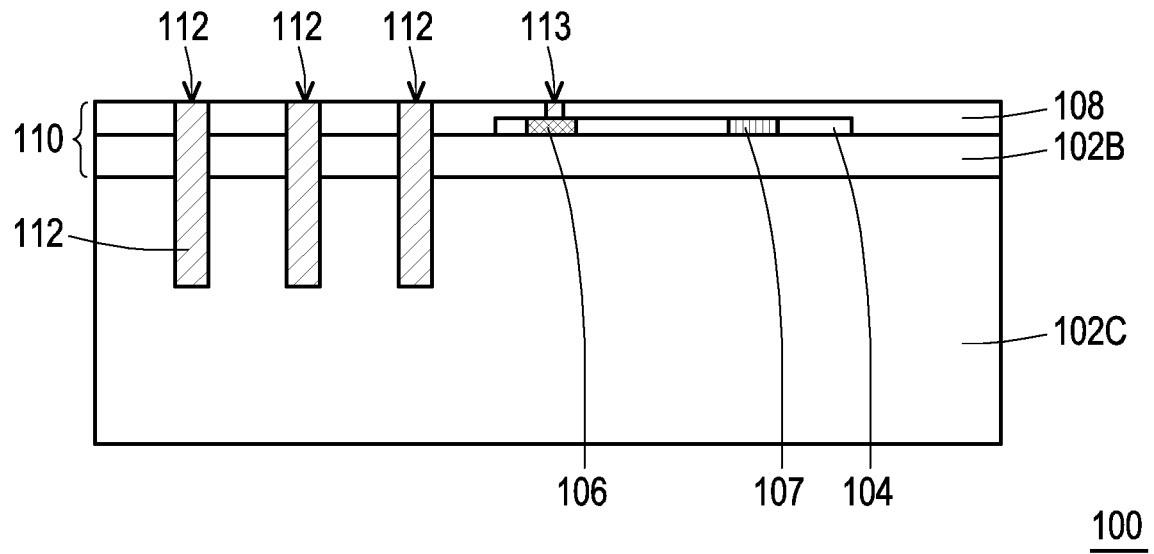

In FIG. 5, a conductive material is formed in the openings 111, thereby forming vias 112, in accordance with some embodiments. In some embodiments, a liner (not shown), such as a diffusion barrier layer, an adhesion layer, or the like, may be formed in the openings 111 from TaN, Ta, TiN, Ti, CoW, or the like, and may be formed using suitable a deposition process such as ALD or the like. In some embodiments, a seed layer (not shown), which may include copper or a copper alloy may then be deposited in the openings 111. The conductive material of the vias 112 is formed in the openings 111 using, for example, ECP or electro-less plating. The conductive material may include, for example, a metal or a metal alloy such as copper, silver, gold, tungsten, cobalt, aluminum, or alloys thereof. A planarization process (e.g., a CMP process or a grinding process) may be performed to remove excess conductive material along the top surface of the dielectric layer 108, such that top surfaces of the vias 112 and the dielectric layer 108 are level.

FIG. 5 also shows the formation of contacts 113 that extend through the dielectric layer 108 and are electrically connected to the photonic components 106. The contacts 113 allow electrical power or electrical signals to be transmitted to the photonic components 106 and electrical signals to be transmitted from the photonic components 106. In this manner, the photonic components 106 may convert electrical signals (e.g., from an electronic die 122, see FIG. 7) into optical signals transmitted by the waveguides 104, and/or convert optical signals from the waveguides 104 into electrical signals (e.g., that may be received by an electronic die 122). The contacts 113 may be formed before or after formation of the vias 112, and the formation of the contacts 113 and the formation of the vias 112 may share some steps such as deposition of the conductive material and/or planarization. In some embodiments, the contact may be formed by a damascene process, e.g., single damascene, dual damascene, or the like. For example, in some embodiments, openings (not shown) for the contacts 113 are first formed in the dielectric layer 108 using acceptable photolithography and etching techniques. A conductive material may then be formed in the openings, forming the contacts 113. Excess conductive material may be removed using a CMP process or the like. The conductive material of the contacts 113 may be formed of a metal or a metal alloy including aluminum, copper, tungsten, or the like, which may be the same as that of the vias 112. The contacts 113 may be formed using other techniques or materials in other embodiments.

Figure 6:
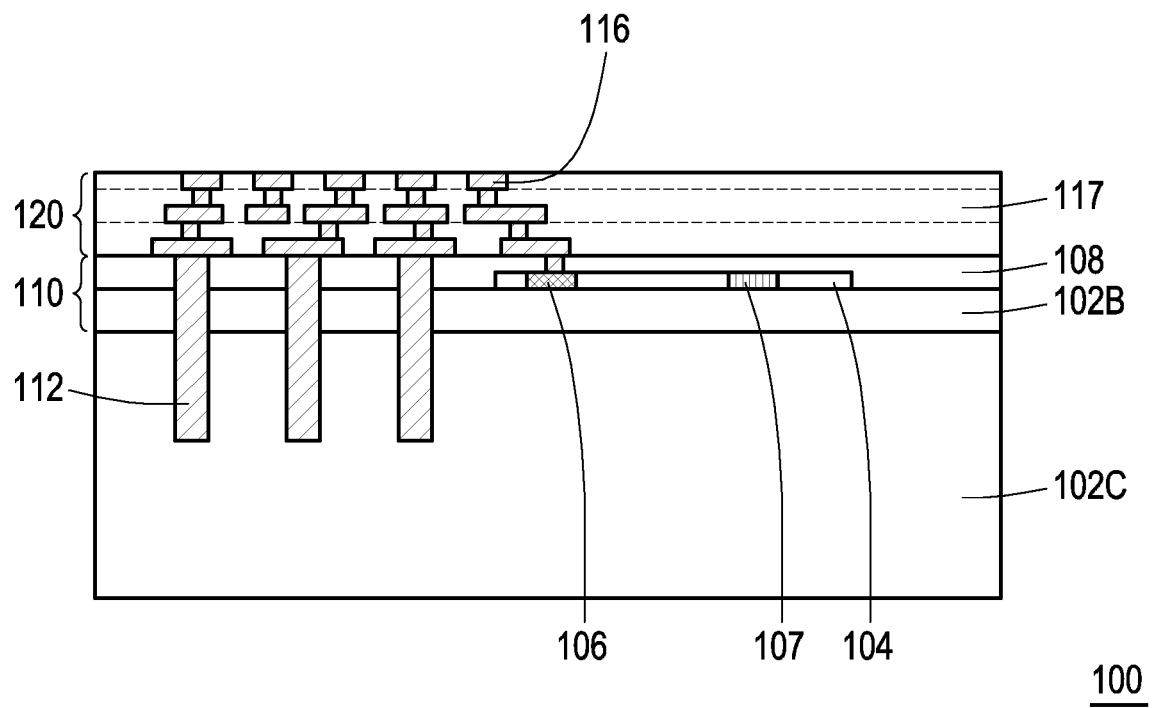

In FIG. 6, an interconnect structure 120 is formed over the dielectric layer 108, in accordance with some embodiments. The interconnect structure 120 includes dielectric layers 117 and conductive features 114 formed in the dielectric layers 117 that provide interconnections and electrical routing. For example, the interconnect structure 120 may connect the vias 112, the contacts 113, and/or overlying devices such as electronic dies 122 (see FIG. 7). The dielectric layers 117 may be, for example, insulating or passivating layers, and may comprise one or more materials similar to those described above for the dielectric layer 108, such as a silicon oxide or a silicon nitride, or may comprise a different material. The dielectric layers 117 and the dielectric layer 108 may be transparent or nearly transparent to light within the same range of wavelengths. The dielectric layers 117 may be formed using a technique similar to those described above for the dielectric layer 108 or using a different technique. The conductive features 114 may include conductive lines and vias, and may be formed by a damascene process, e.g., single damascene, duel damascene, or the like. As shown in FIG. 6, conductive pads 116 are formed in the topmost layer of the dielectric layers 117. A planarization process (e.g., a CMP process or the like) may be performed after forming the conductive pads 116 such that surfaces of the conductive pads 116 and the topmost dielectric layer 117 are substantially coplanar. The interconnect structure 120 may include more or fewer dielectric layers 117, conductive features 114, or conductive pads 116 than shown in FIG. 6.

Figure 7:
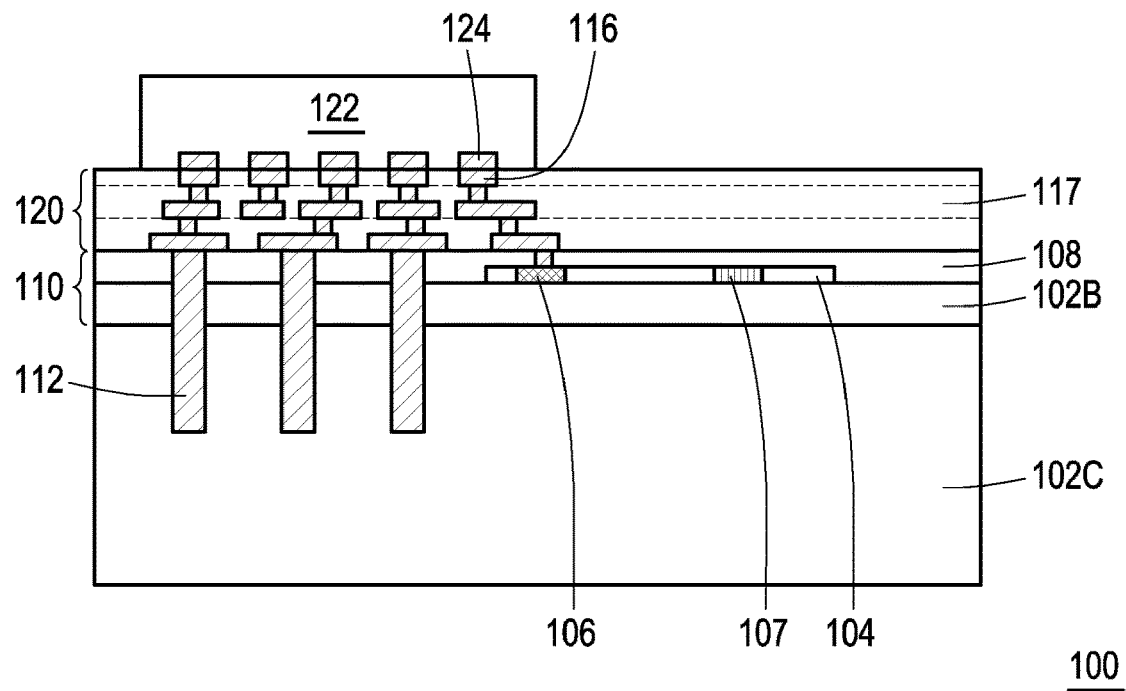

In FIG. 7, one or more electronic dies 122 are bonded to the interconnect structure 120, in accordance with some embodiments. The electronic dies 122 may be, for example, semiconductor devices, dies, or chips that communicate with the photonic components 106 using electrical signals. One electronic die 122 is shown in FIG. 7, but the photonic package 100 may include two or more electronic dies 122 in other embodiments. In some cases, multiple electronic dies 122 may be incorporated into the single photonic package 100 in order to reduce processing cost. The electronic die 122 may include die connectors 124, which may be, for example, conductive pads, conductive pillars, or the like.

The electronic die 122 may include integrated circuits for interfacing with the photonic components 106, such as circuits for controlling the operation of the photonic components 106. For example, the electronic die 122 may include controllers, drivers, transimpedance amplifiers, the like, or combinations thereof. The electronic die 122 may also include a CPU, in some embodiments. In some embodiments, the electronic die 122 includes circuits for processing electrical signals received from photonic components 106, such as for processing electrical signals received from a photonic component 106 comprising a photodetector. The electronic die 122 may control high-frequency signaling of the photonic components 106 according to electrical signals (digital or analog) received from another device or die, in some embodiments. In some embodiments, the electronic die 122 may be an electronic integrated circuit (EIC) or the like that provides Serializer/Deserializer (SerDes) functionality.

In some embodiments, an electronic die 122 is bonded to the interconnect structure 120 by dielectric-to-dielectric bonding and/or metal-to-metal bonding (e.g., direct bonding, fusion bonding, oxide-to-oxide bonding, hybrid bonding, or the like). In such embodiments, covalent bonds may be formed between oxide layers, such as the topmost dielectric layer 117 and surface dielectric layers (not shown) of the electronic die 122. During the bonding, metal bonding may also occur between the die connectors 124 of the electronic die 122 and the conductive pads 116 of the interconnect structure 120.

In some embodiments, before performing the bonding process, a surface treatment is performed on the electronic die 122. In some embodiments, the top surfaces of the interconnect structure 120 and/or the electronic die 122 may first be activated utilizing, for example, a dry treatment, a wet treatment, a plasma treatment, exposure to an inert gas, exposure to $H_2$, exposure to $N_2$, exposure to $O_2$, the like, or combinations thereof. However, any suitable activation process may be utilized. After the activation process, the interconnect structure 120 and/or the electronic die 122 may be cleaned using, e.g., a chemical rinse. The electronic die 122 is then aligned with the interconnect structure 120 and placed into physical contact with the interconnect structure 120. The electronic die 122 may be placed on the interconnect structure 120 using a pick-and-place process, for example. An example hybrid bonding process includes directly bonding the topmost dielectric layer 117 and surface dielectric layers (not shown) of the electronic die 122 through fusion bonding. In an embodiment, the bond between the topmost dielectric layer 117 and surface dielectric layers (not shown) of the electronic die 122 may be an oxide-to-oxide bond. The hybrid bonding process further directly bonds the conductive pads 116 and the die connectors 124 through direct metal-to-metal bonding. Thus, the electronic die 122 and the interconnect structure 120 are electrically connected. This process starts with aligning the conductive pads 116 to the die connectors 124, such that the die connectors 124 overlap with corresponding conductive pads 116. Next, the hybrid bonding includes a pre-bonding step, during which the electronic die 122 is put in contact with the interconnect structure 120. The hybrid bonding process continues with performing an anneal, for example, at a temperature between about 100° C. and about 450° C. for a duration between about 0.5 hours and about 3 hours, so that the metal in the conductive pads 116 and the die connectors 124 inter-diffuses to each other, and hence the direct metal-to-metal bonding is formed.

Figure 8:
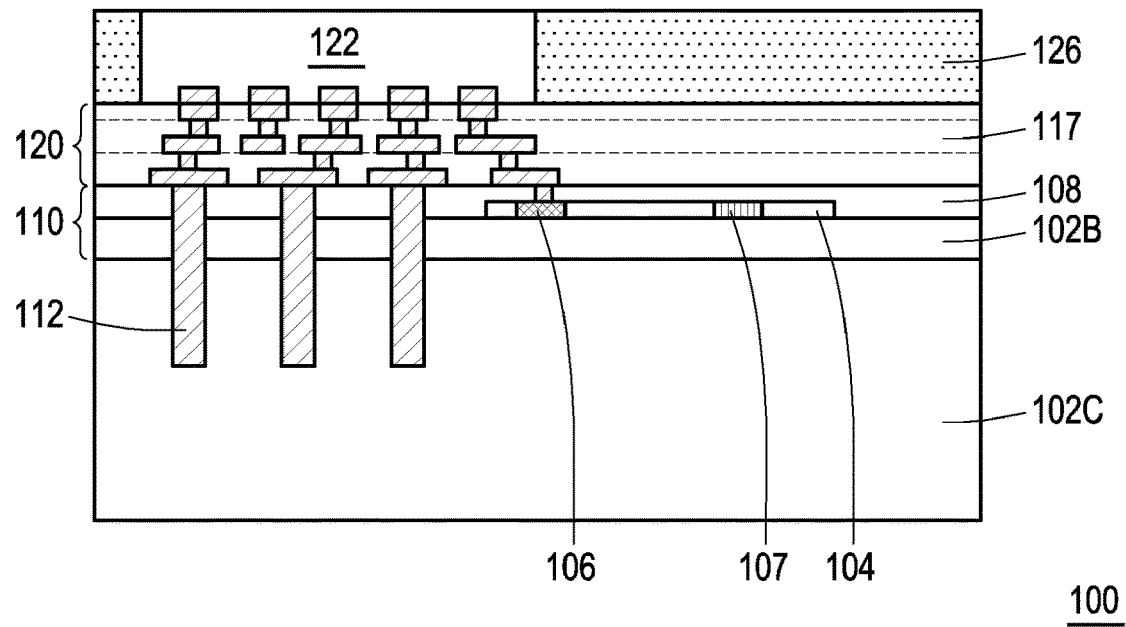

In FIG. 8, a dielectric material 126 is formed over the electronic die 122 and the interconnect structure 120, in accordance with some embodiments. The dielectric material 126 may be formed of a transparent oxide film or silicon based material, such as silicon, SiOx, silicon nitride, the like, or a combination thereof. The dielectric material 126 may be formed by CVD, PVD, ALD, a spin-on-dielectric process, the like, or a combination thereof. In some embodiments, the dielectric material 126 may be formed by HDP-CVD, FCVD, the like, or a combination thereof. The dielectric material 126 may be a gap-fill material in some embodiments, which may include one or more of the example materials above. Other dielectric materials formed by any acceptable process may be used. The dielectric material 126 may be planarized using a planarization process such as a CMP process, a grinding process, or the like. In some embodiments, the planarization process may expose the electronic die 122 such that a surface of the electronic die 122 and a surface of the dielectric material 126 are coplanar.

Figure 9:
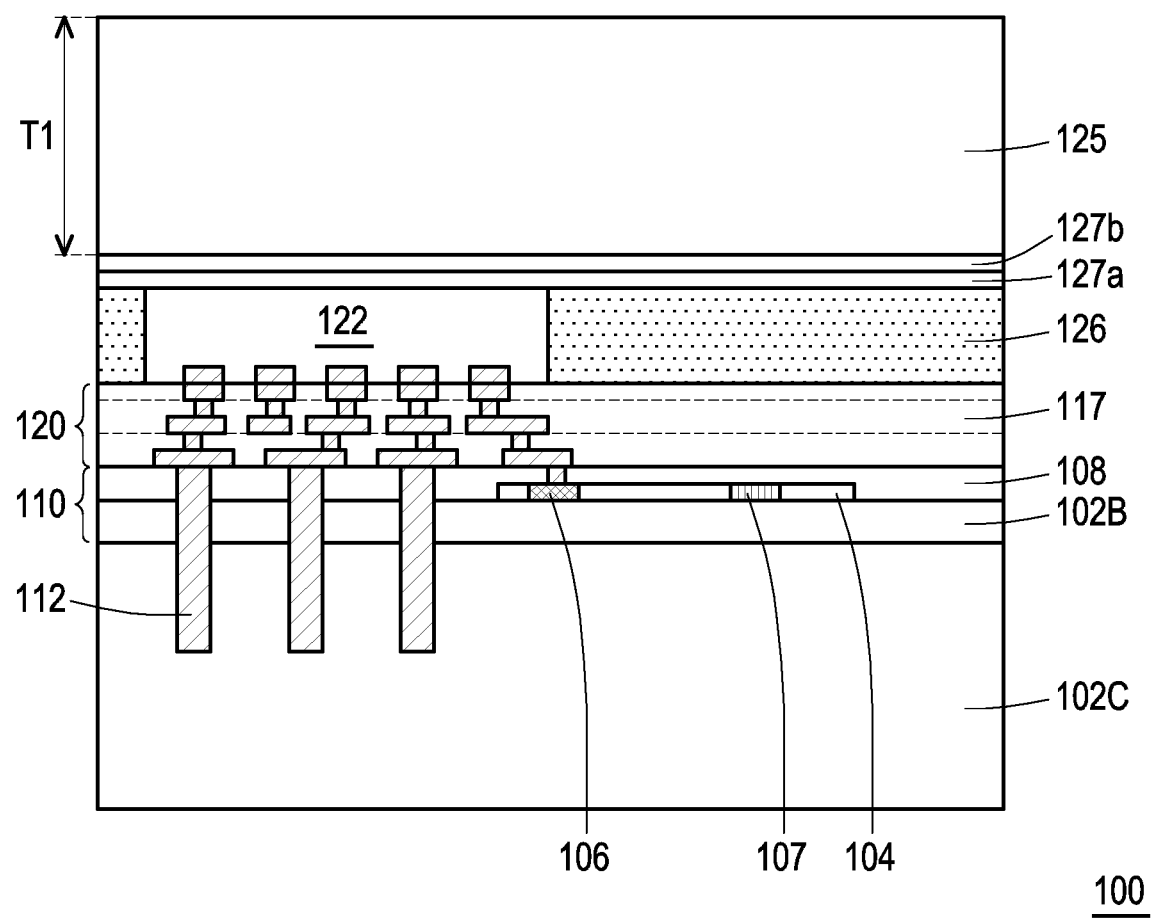

In FIG. 9, a support substrate 125 is attached to the structure, in accordance with some embodiments. The support substrate 125 is a rigid structure that is attached to the structure and may provide structural or mechanical stability. The support substrate is used as a support over which the separable fiber attachment and the polymer micro lens (shown subsequently in FIG. 13C) are formed. In an embodiment, the support substrate 125 may also function as a heat spreader to help improve heat dissipation efficiency in the photonic package 100 (shown subsequently in FIG. 13C). The support substrate 125 may comprise one or more materials such as silicon (e.g., a silicon wafer, bulk silicon, or the like), a silicon oxide, an organic core material, the like, or another type of material. The support substrate 125 may also have lateral dimensions (e.g., length, width, and/or area) that are greater than, about the same as, or smaller than those of the structure. In an embodiment, the support substrate 125 may have a thickness Ti that is in a range from 10 μm to 10000 μm. In other embodiments, the support substrate 125 is attached at a later process step during the manufacturing the photonic package 100 than shown. The support substrate 125 may be attached to the structure (e.g., to the dielectric material 126 and/or the electronic dies 122) by using dielectric-to-dielectric bonding (e.g., direct bonding, fusion bonding, oxide-to-oxide bonding, or the like). For example, a bonding layer 127a may be formed on top surfaces of the dielectric material 126 and the electronic die 122. A bonding layer 127b may also be formed on a top surface of the support substrate 125. In an embodiment, the bonding layers may comprise any material that is capable of forming a dielectric-to-dielectric bond. For example, the bonding layers 127a/b may comprise silicon oxide (e.g., $SiO_2$), silicon oxynitride, silicon nitride, or the like formed by CVD, PVD, or the like. The bonding of the bonding layer 127b of the support substrate 125 to the bonding layer 127a of the dielectric material 126 and/or the electronic dies 122 is then performed using a process that may include a pre-bonding and an annealing. During the pre-bonding, a small pressing force is applied to press the support substrate 125 against the dielectric material 126 and/or the electronic dies 122. The pre-bonding is performed at a low temperature, such as room temperature, such as a temperature in the range of 15° C. to 30° C., and after the pre-bonding, the bonding layer 127a and the bonding layer 127b are bonded to each other. The bonding strength is then improved in a subsequent annealing step, in which the bonding layers 127a/b are annealed at a high temperature, such as a temperature in the range of 140° C. to 500° C. After the annealing, bonds, such as fusion bonds, are formed bonding the bonding layer 127a and the bonding layer 127b. For example, the bonds can be covalent bonds between the material of the bonding layer 127a and the material of the bonding layer 127b.

Figure 10:
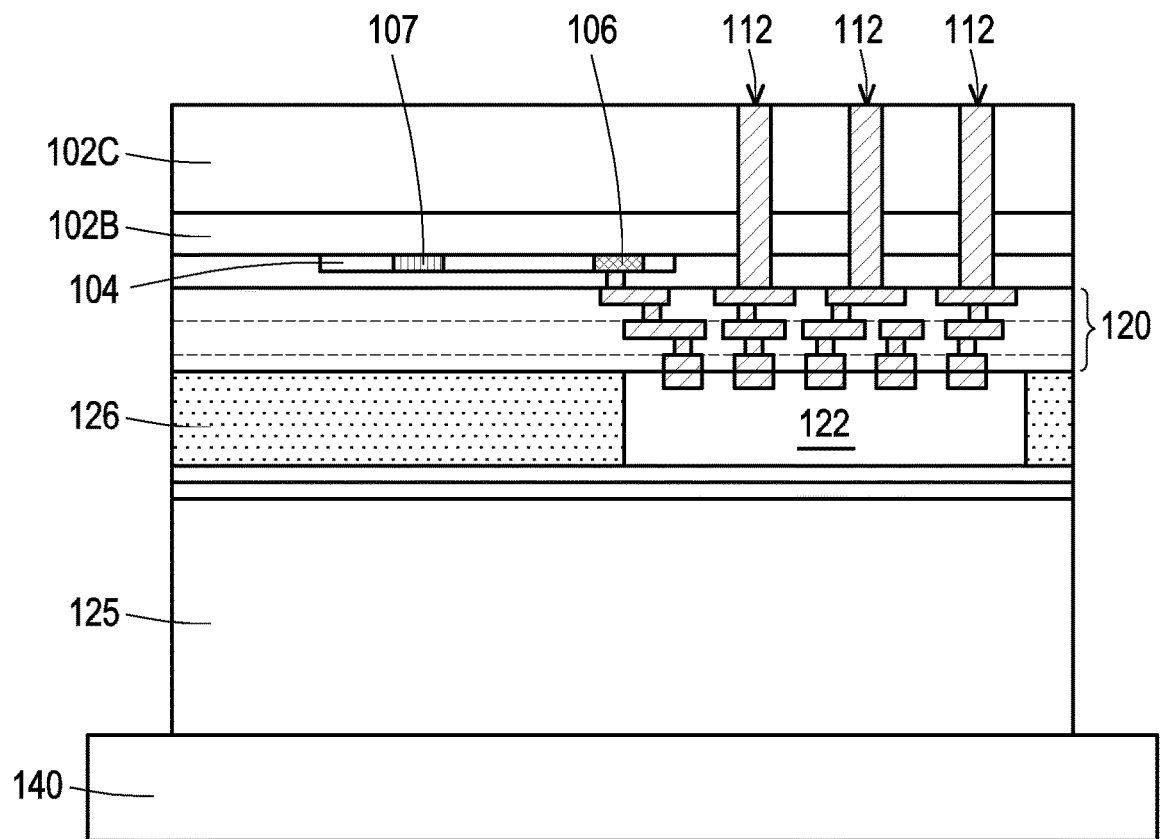

In FIG. 10, the structure is flipped over and attached to a carrier 140, in accordance with some embodiments. The carrier 140 may be, for example, a wafer (e.g., a silicon wafer), a panel, a glass substrate, a ceramic substrate, or the like. The structure may be attached to the carrier 140 using, for example, an adhesive or a release layer (not shown). The back side of the substrate 102C is then thinned to expose the vias 112, in accordance with some embodiments. The substrate 102C may be thinned by a CMP process, a mechanical grinding, an etching process, the like, or a combination thereof.

Figure 11:
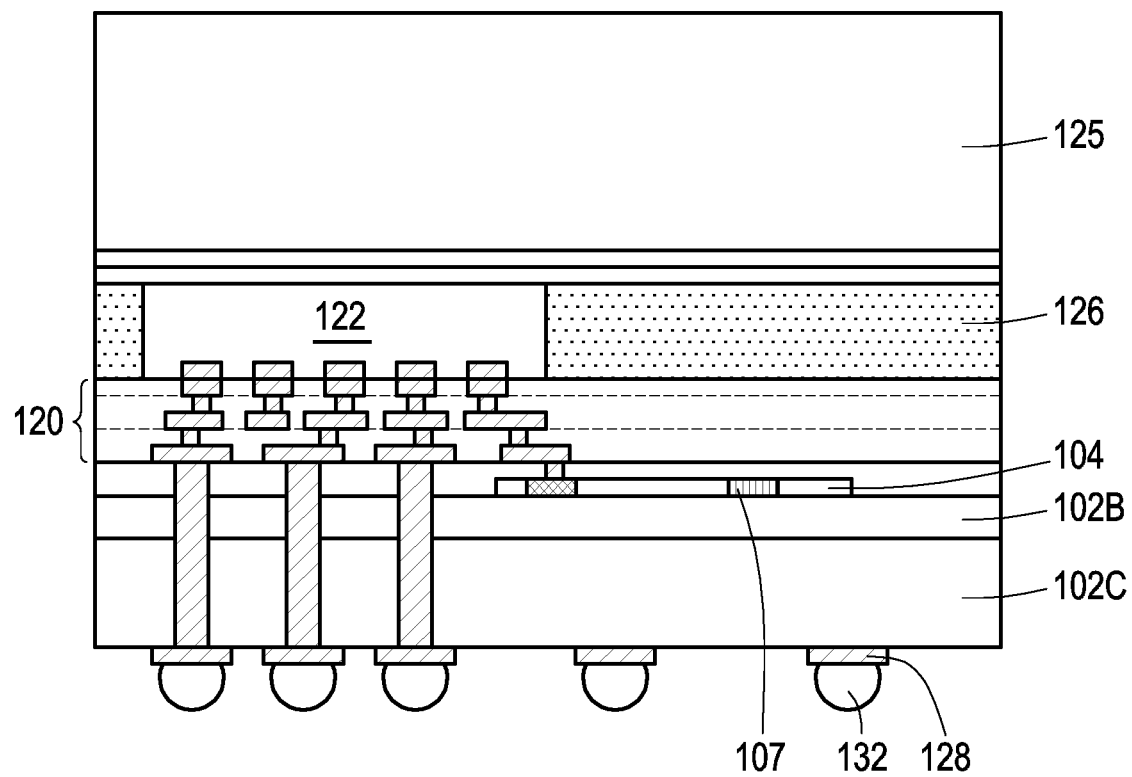

In FIG. 11, conductive pads 128 are formed on the exposed vias 112 and the substrate 102C, in accordance with some embodiments. The conductive pads 128 may be conductive pads or conductive pillars that are electrically connected to the interconnect structure 120. The conductive pads 128 may be formed from a conductive material such as copper, another metal or metal alloy, the like, or combinations thereof. The material of the conductive pads 128 may be formed by a suitable process, such as plating. For example, in some embodiments, the conductive pads 128 are metal pillars (such as copper pillars) formed by a sputtering, printing, electro plating, electroless plating, CVD, or the like. The metal pillars may be solder free and have substantially vertical sidewalls. In some embodiments, a metal cap layer (not shown) is formed on the top of the conductive pads 128. The metal cap layer may include nickel, tin, tin-lead, gold, silver, palladium, indium, nickel-palladium-gold, nickel-gold, the like, or a combination thereof and may be formed by a plating process. In some embodiments, underbump metallizations (UBMs, not shown) may be formed over the conductive pads 128. In some embodiments, a passivation layer (not shown) such as a silicon oxide or silicon nitride may be formed over the substrate 102C to surround or partially cover the conductive pads 128.

Still referring to FIG. 11, conductive connectors 132 may be formed on the conductive pads 128 to form a photonic package 100, in accordance with some embodiments. The conductive connectors 132 may be ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors 132 may include a conductive material such as solder, copper, aluminum, gold, nickel, silver, palladium, tin, the like, or a combination thereof. In some embodiments, the conductive connectors 132 are formed by initially forming a layer of solder through such commonly used methods such as evaporation, electroplating, printing, solder transfer, ball placement, or the like. Once a layer of solder has been formed on the structure, a reflow may be performed in order to shape the material into the desired bump shapes. In another embodiment, the conductive connectors 132 are metal pillars (such as a copper pillar) formed by a sputtering, printing, electro plating, electroless plating, CVD, or the like. The metal pillars may be solder free and have substantially vertical sidewalls. In some embodiments, a metal cap layer (not shown) is formed on the top of the conductive connectors 132. The metal cap layer may include nickel, tin, tin-lead, gold, silver, palladium, indium, nickel-palladium-gold, nickel-gold, the like, or a combination thereof and may be formed by a plating process.

Figure 12:
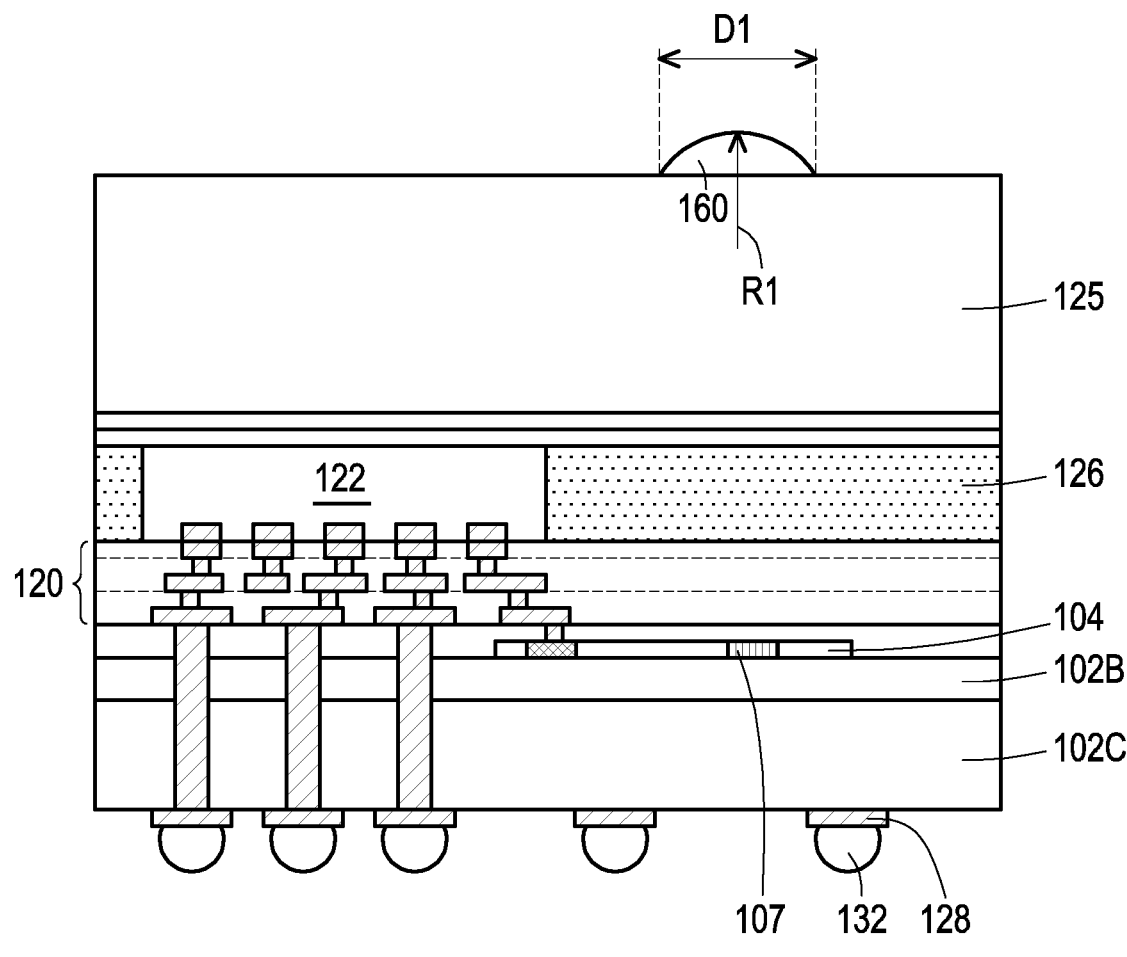

In FIG. 12, a micro lens 160 is formed on a top surface of the support substrate 125 using acceptable photolithography techniques. For example, a polymer layer that may comprise siloxane, epoxy, acrylate, polynorbornene, or the like is first deposited on the top surface of the support substrate 125 using a coating technique such as spin-coating, or the like. Portions of the polymer layer are then selectively exposed to electromagnetic radiation using a photomask to modify the solubility of these portions of the polymer layer as a result of chemical changes in its molecular structure. The exposed portions of the polymer layer may then be developed to dissolve these portions and leave an unexposed portion of the polymer layer on the top surface of the support substrate 125. A curing process may then be performed on the remaining portion of the polymer layer to complete the formation of the micro lens 160. The micro lens 160 may have a diameter D1 that is in a range from 5 μm to 300 μm. The micro lens 160 may have a radius of curvature R1 that is in a range from 3 μm to 500 μm. The micro lens 160 may have a refractive index that is in a range from 1.4 to 3.5. In some embodiments, the micro lens 160 is positioned such that optical signals from the optical fiber 150 (shown subsequently in FIG. 13C) are directed through the micro lens 160 and to the coupler 107 of the photonic package 100. In this way, the optical fiber 150 is optically coupled to the coupler 107 of the photonic package 100.

In some embodiments, multiple photonic packages 100 may be formed on a single BOX substrate 102 and then singulated to form individual photonic packages 100 such as the photonic package 100 shown in FIG. 12. The singulation may be performed using a suitable technique, such as using a saw, laser, the like, or a combination thereof. The photonic package 100 described herein allows for optical communication with an optical fiber 150, shown below in FIG. 13C.

Figure 13A:
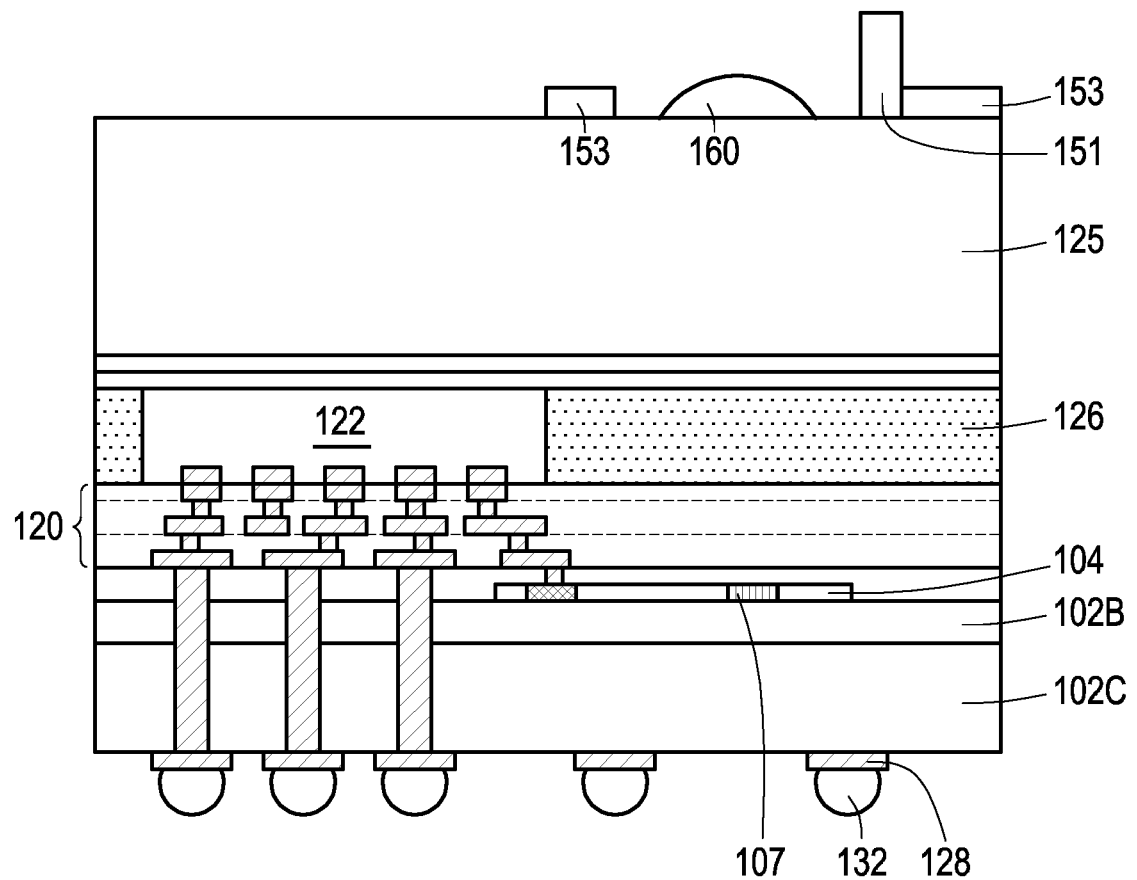
FIG. 13D illustrates a cross-sectional view of intermediate steps of forming a photonic package, in accordance with some embodiments.

In FIG. 13A, a guide-pin 151 is formed on the top surface of the support substrate 125. The guide-pin 151 may be used for alignment during a subsequent process to attach a socket 154 to the top surface of the support substrate 125 (shown in FIG. 13B). The guide pin 151 may comprise a polymer that is similar or different to that of the micro lens 160. In an embodiment, the guide-pin 151 is formed using similar processes to that as described in the formation of the micro lens 160. In an embodiment, the micro lens 160 and the guide-pin 151 comprise the same material and are formed concurrently using the same processes.

Figure 13B:
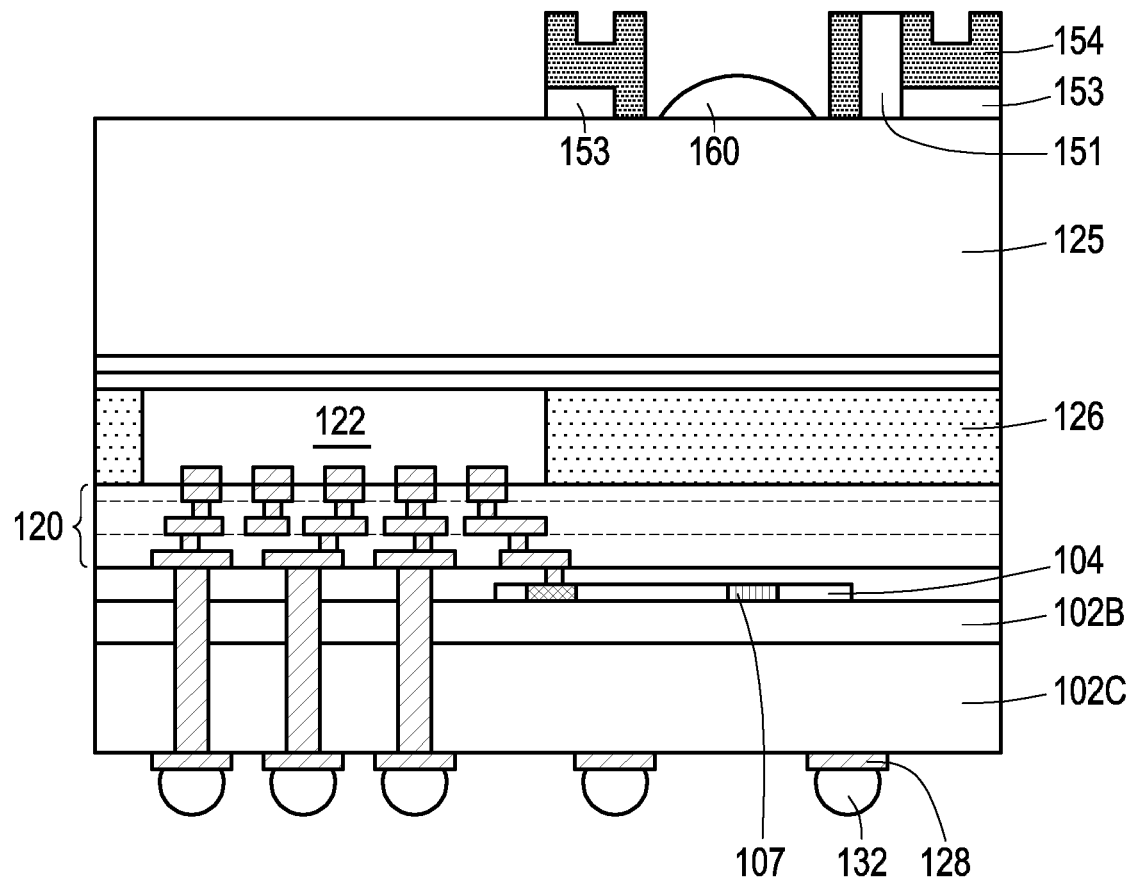

Still referring to FIG. 13A, optical gel 153 may then be optionally applied to the tops surface of the support substrate 125 to aid in the subsequent attachment of the socket 154 to the top surface of the support substrate 125 (shown in FIG. 13B)

In FIG. 13B, the socket 154 is attached to the top surface of the support substrate 125 using for example, a pick and place process. The socket 154 may comprise a socket opening that fits on to the guide-pin 151, allowing the socket 154 to be aligned and positioned in relation to the guide-pin 151. The socket 154 may be attached such that inner sidewalls of the socket 154 surround the micro lens 160. The socket 154 may be comprised of a thermally durable material such as polyethylene terephthalate (PET), high-density polyethylene (PE), polyvinyl chloride (PVC), acrylonitrile butadiene styrene (ABS), polymethyl methacrylate (PMMA), fiber-reinforced plastic (FRP), or the like.

Figure 13C:
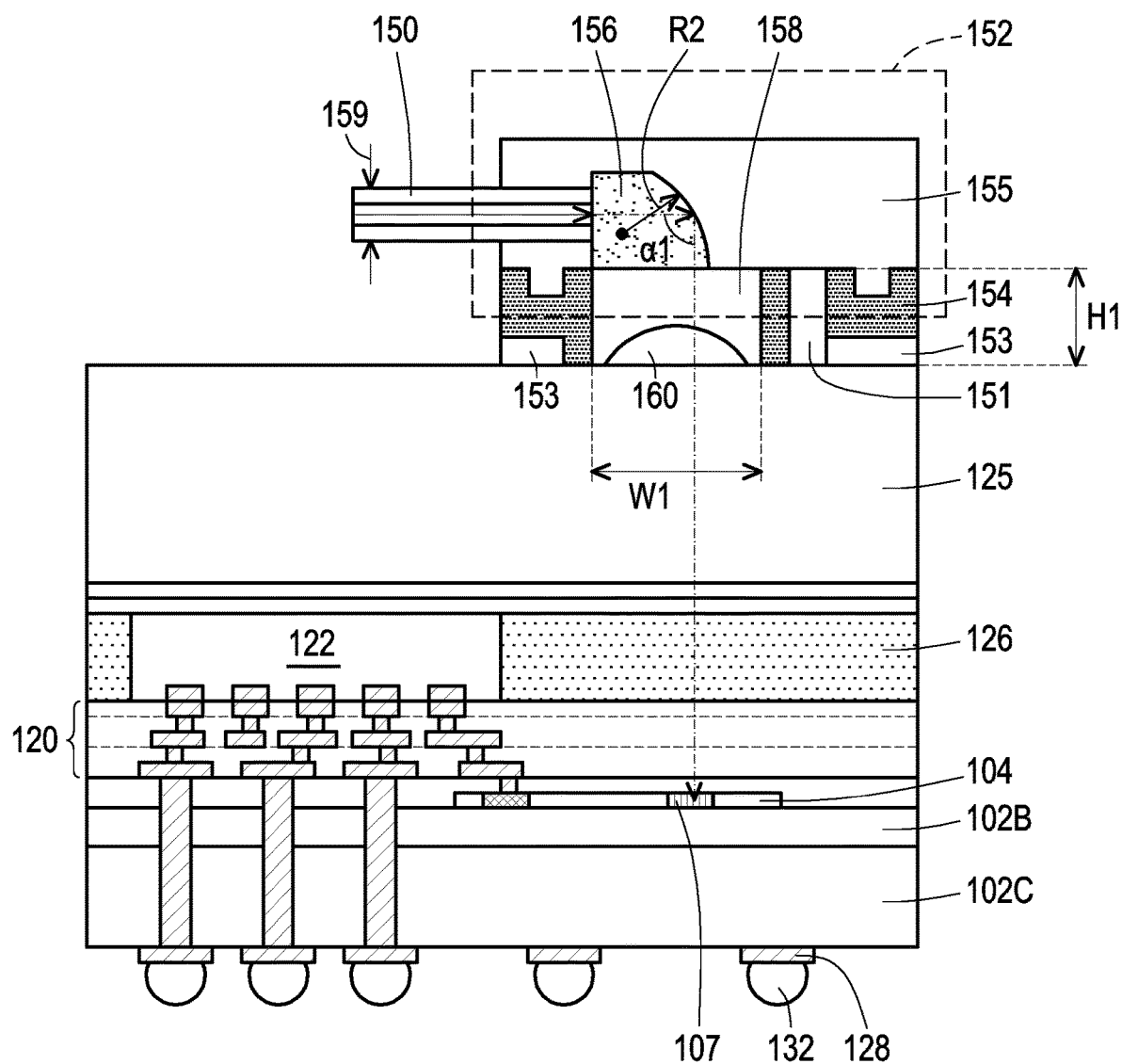

In FIG. 13C, a fiber holder 152 is then coupled to the socket 154 using for example, a pick and place process, allowing the support substrate 125 to support the socket 154 and the fiber holder 152. The fiber holder 152 serves as a separable fiber attachment and allows optical communication between optical fiber 150 that is laterally connected to the fiber holder 152 and the coupler 107 (e.g., a grating coupler), formed in the waveguides 104. The fiber holder 152 may comprise a casing 155 that holds a prism 156. The casing 155 may be formed from a plastic or epoxy-based material. The prism 156 is used to re-orient (e.g., reflect and vertically turn) the optical path of the optical signal from the optical fiber 150. Accordingly, the optical path of light from the optical fiber 150 may be adjusted without physically bending the optical fiber 150, which improves robustness. The prism 156 may comprise a polymer waveguide formed from a reflective polymer material such as siloxane, epoxy, acrylate, polynorbornene, or the like. The prism 156 may re-orient the optical path of the optical signal from the optical fiber 150 by an angle α1, where the angle α1 is larger than 0°, and where the angle α1 is equal to or smaller than 90°. In an embodiment, the prism 156 may have a radius of curvature R2 that is in a range from 10 μm to 900 μm.

The fiber holder 152 further includes a channel 159 located at the edge of the fiber holder 152 into which the optical fiber 150 may be inserted. The channel 159 secures the optical fiber 150 in a desired orientation, while still allowing the optical fiber 150 to be easily removed and/or repositioned. In an embodiment, the optical fiber 150 may also be attached to the fiber holder 152 using a pick and place process that utilizes a passive alignment procedure. In an embodiment, the inner sidewalls of the socket 154 that surround the micro lens 160 and a bottom surface of the fiber holder 152 form a cavity 158 above the support substrate 125 in which the micro lens 160 is situated. The cavity 158 may be filled with air. The width W1 of the cavity 158 may be in a range from 1 μm to 500 μm. The height H1 of the cavity may be in a range from 1 μm to 100 μm.

Advantages can be achieved as a result of the formation of the separable fiber holder 152 and the polymer micro lens 160 on top of the support substrate 125 of the photonic package 100, where the fiber holder 152 includes the prism 156. These advantages include the separable fiber holder 152 supporting a re-orientation (e.g., vertically turning) of the optical path while still maintaining robustness of the optical fiber 150 with a lower susceptibility to optical fiber 150 breakage, and better tolerance and protection from particles falling on the micro lens 160 than if no fiber holder 152 is used. These particles may negatively affect optical communication. In addition, a wafer level process can be used to form the micro lens 160 that utilizes lithography that allows for higher throughput and alignment accuracy when forming the polymer micro lens 160. Further, the use of the polymer micro lens 160 and the prism 156 and its topography allows for improved alignment of the optical path by allowing adjustments to be easily made to the optical path. Also, the use of the polymer micro lens 160 results in reduced alignment tolerances and a better spot size conversion with improved throughput (e.g., allowing for optical signals with larger wavelengths), which enables the photonic package 100 to be used in a broader range of applications such as virtual reality and augmented reality that require the ability to transmit optical signals that comprise larger wavelengths.

Figure 13D:
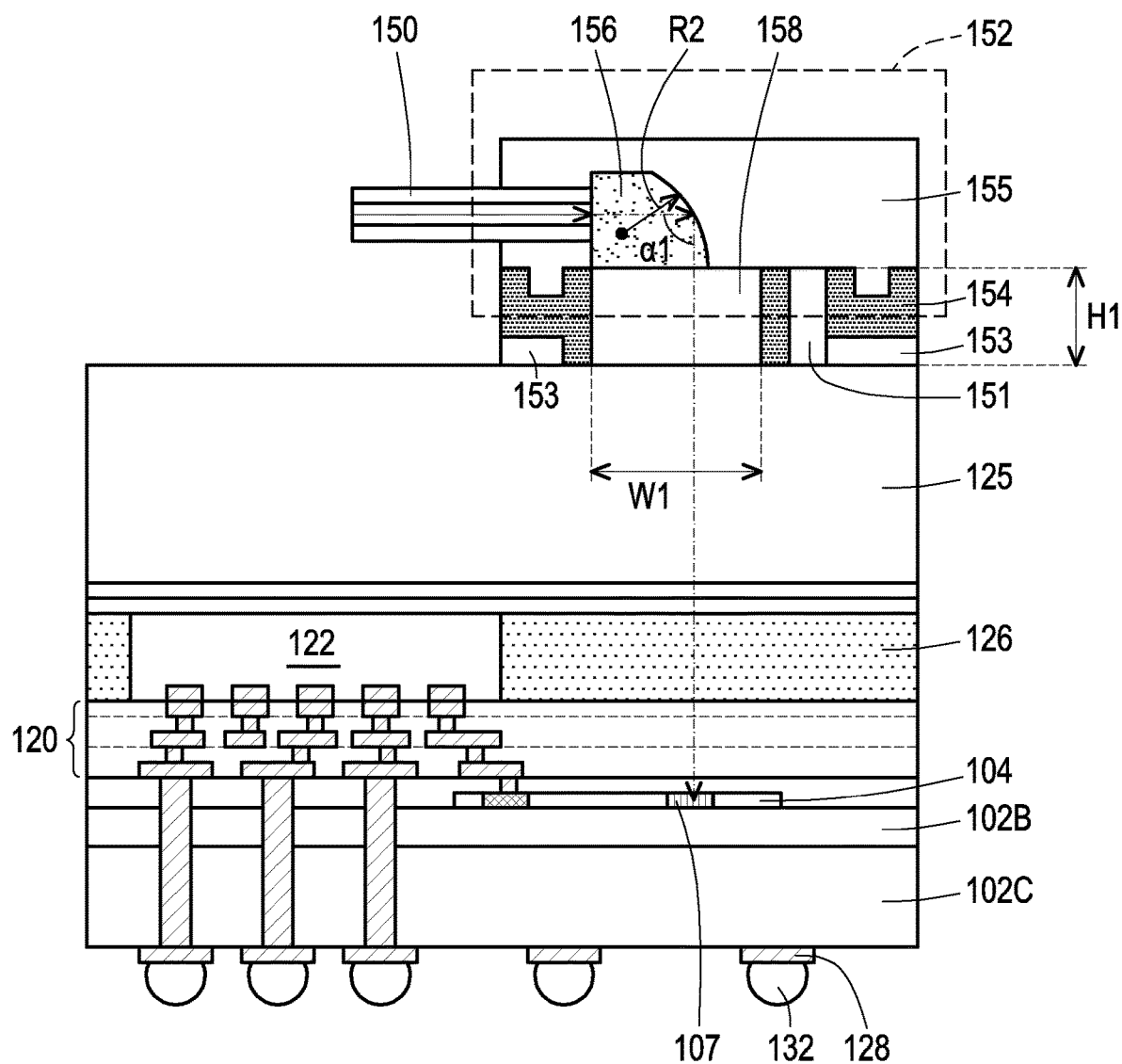

FIG. 13D illustrates a photonic package 200, which may be similar to the photonic package 100 of FIGS. 1 through 13C where like reference numerals indicate like elements formed using like processes, unless specified otherwise. Accordingly, the process steps and applicable materials may not be repeated herein. The initial steps of this embodiment are essentially the same as shown in FIGS. 1 through 11. The socket 154 and the fiber holder 152 are then attached to the support substrate 125 while omitting the steps shown in FIG. 12, thereby omitting the attachment of the micro lens 160 to the support substrate 125. For example, the photonic package 200 may be free of any micro lens on a surface of the support substrate 125.

Advantages can be achieved as a result of the formation of the separable fiber holder 152 on top of the support substrate 125 of the photonic package 200, where the fiber holder 152 includes the prism 156. These advantages include the separable fiber holder 152 supporting a re-orientation (e.g., vertically turning) of the optical path while still maintaining robustness of the optical fiber 150 with a lower susceptibility to optical fiber 150 breakage.

FIGS. 14A through 14D illustrate a photonic package 300, which may be similar to the photonic package 100 and the photonic package 200 of FIGS. 1 through 13D where like reference numerals indicate like elements formed using like processes, unless specified otherwise. Accordingly, the process steps and applicable materials may not be repeated herein. The initial steps of this embodiment are essentially the same as shown in FIGS. 1 through 12. In, FIG. 14A, a polymer layer 162 may be formed over the micro lens 160, such that the micro lens 160 is embedded in the polymer layer 162. The polymer layer 162 may comprise siloxane, epoxy, acrylate, polynorbornene, a combination, thereof, or the like, and may be deposited over the micro lens 160 and the top surface of the support substrate 125 using a coating technique such as spin-coating, or the like. The polymer layer 162 may then be patterned using an acceptable photolithography process. In an embodiment, a curing process may also be performed on the polymer layer 162.

Figure 14A:
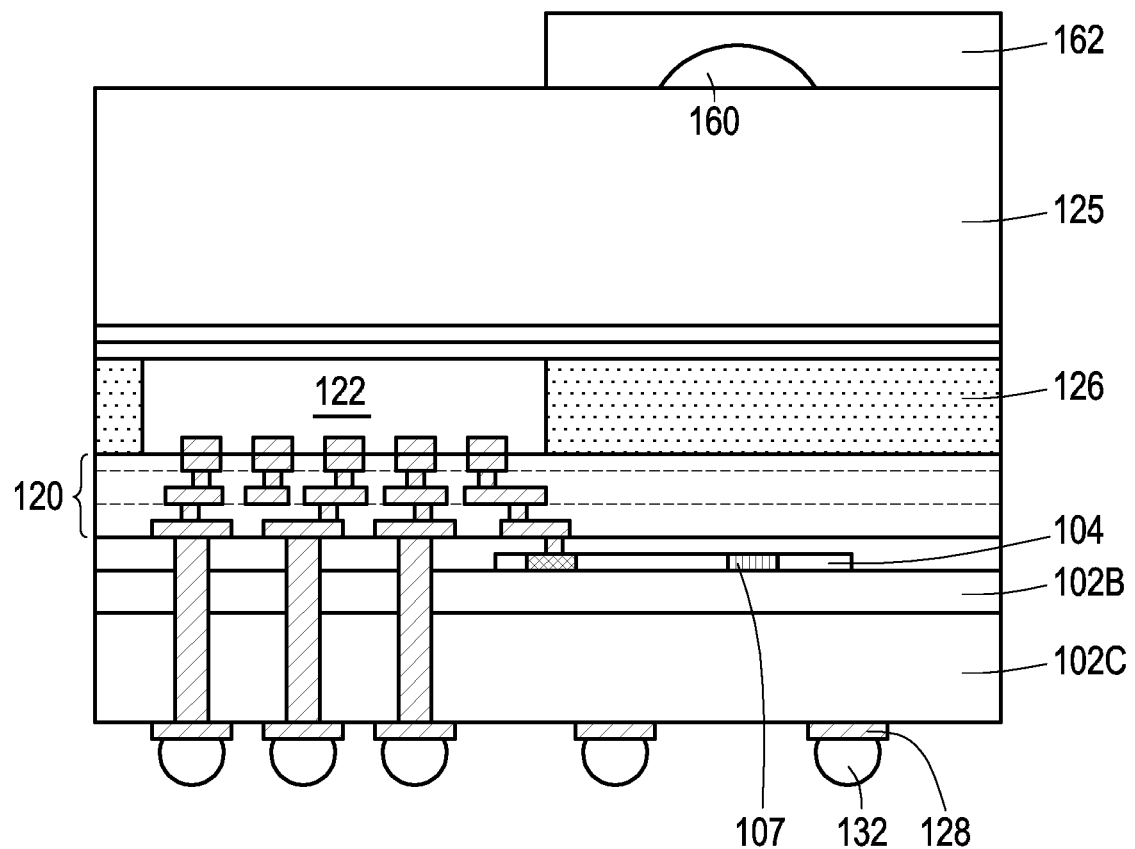
FIGS. 14A through 14D illustrate cross-sectional views of intermediate steps of forming a photonic package, in accordance with some embodiments.
Figure 14B:
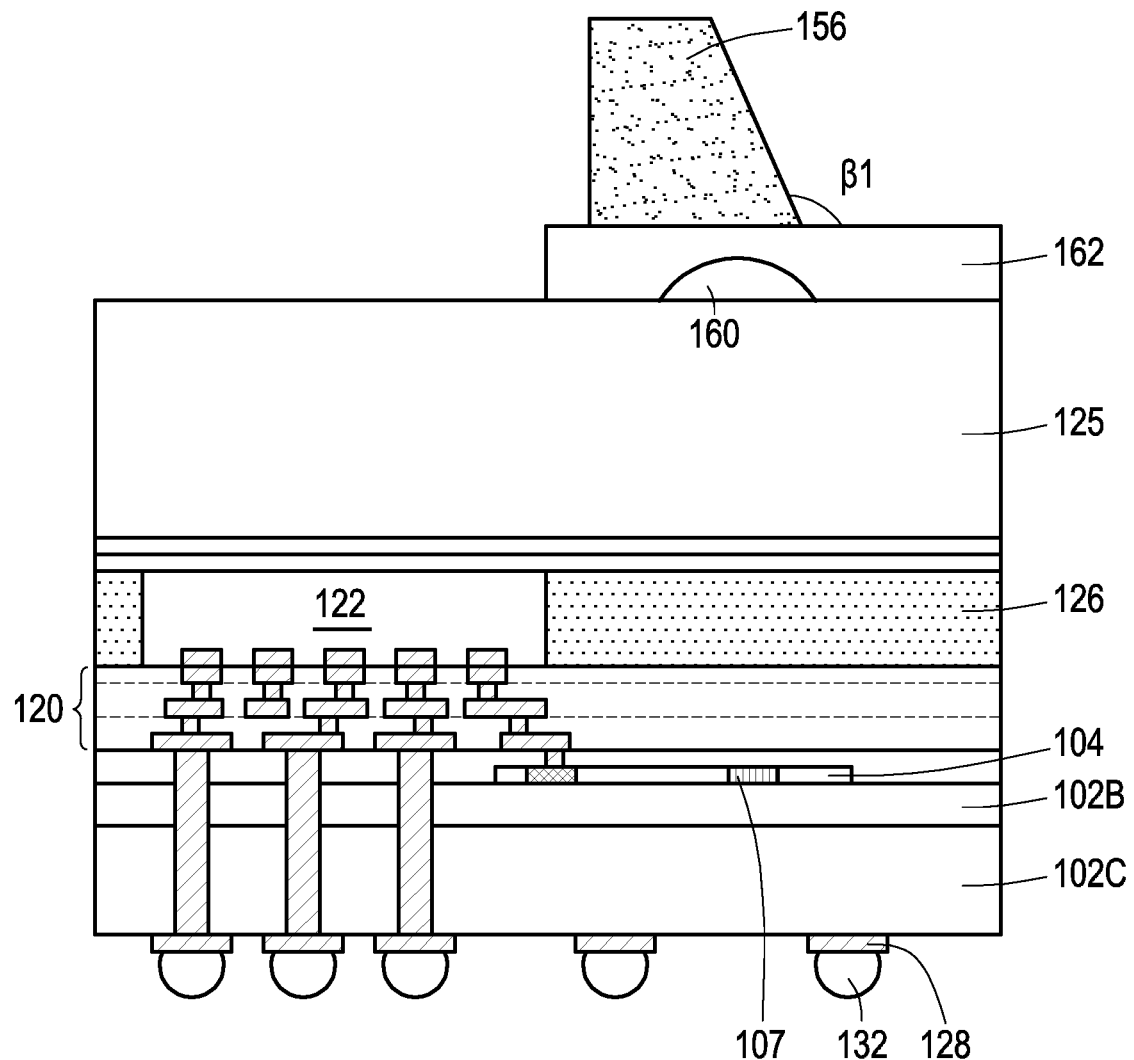

In FIG. 14B, a prism 156 is formed on a top surface of the polymer layer 162. The prism 156 may comprise a polymer waveguide and may be formed by first depositing a reflective polymer layer that may comprise siloxane, epoxy, acrylate, polynorbornene, or the like, over the polymer layer 162 and the top surface of the support substrate 125 using a coating technique such as spin-coating, or the like. The polymer layer may then be patterned using an acceptable photolithography process to remove portions of the polymer layer, and leave a portion of the polymer layer that forms the prism 156 on top of the polymer layer 162. In an embodiment, the prism 156 is then subjected to a curing process.

Figure 14C:
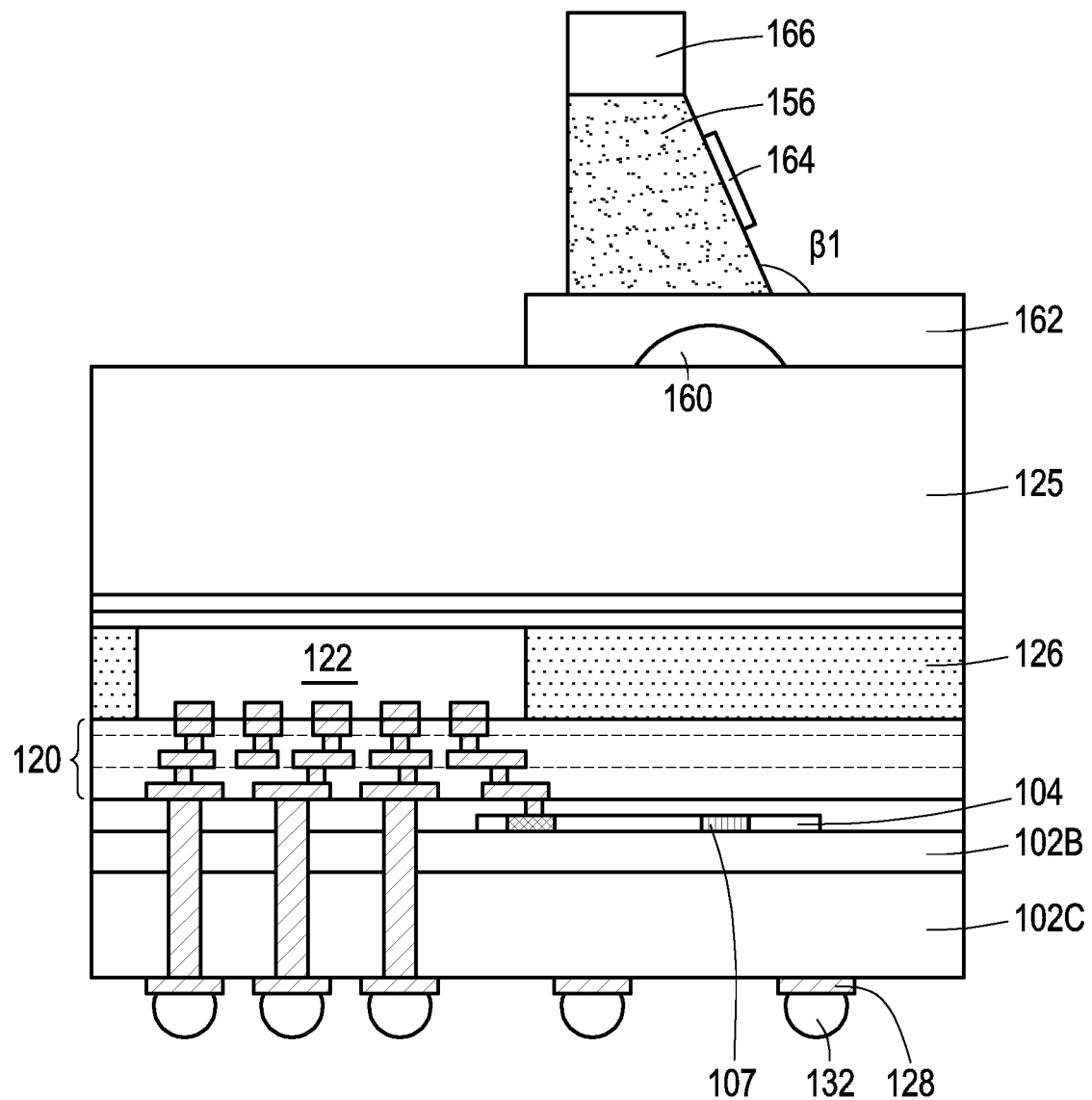

In FIG. 14C, a polymer layer 166 may be formed over the prism 156. The polymer layer 166 may comprise siloxane, epoxy, acrylate, polynorbornene, a combination, thereof, or the like, and may be deposited over the prism 156, the polymer layer 162, and the top surface of the support substrate 125 using a coating technique such as spin-coating, or the like. The polymer layer 166 may then be patterned using an acceptable photolithography process to remove portions of the polymer layer 166, and leave a remaining portion of the polymer layer 166 on the prism 156. In an embodiment, a curing process may then be performed on the polymer layer 166.

Still referring to FIG. 14C, a reflector 164 may be formed on a sidewall of the prism 156 using acceptable photolithography techniques. For example, a photoresist layer may be formed over the support substrate 125, the polymer layer 166, the polymer layer 160 and the prism 156. The photoresist layer may then be patterned to expose the sidewall of the prism 156. A metal, such as copper, or the like, is then deposited on the exposed sidewall of the prism 156 using CVD, PVD, or the like, forming the reflector 164. The photoresist layer may then be removed by a suitable removal process, such as ashing or etching. In an embodiment, the prism 156 may be an arc prism having a sidewall that is curved, and wherein the sidewall has a radius of curvature that is in a range from 10 μm to 900 μm. In an embodiment, the sidewall curves from a topmost point of the sidewall to a bottommost point of the sidewall. In an embodiment, the reflector 164 may be formed on the curved sidewall of the prism 156, and the reflector 164 is also curved.

Figure 14D:
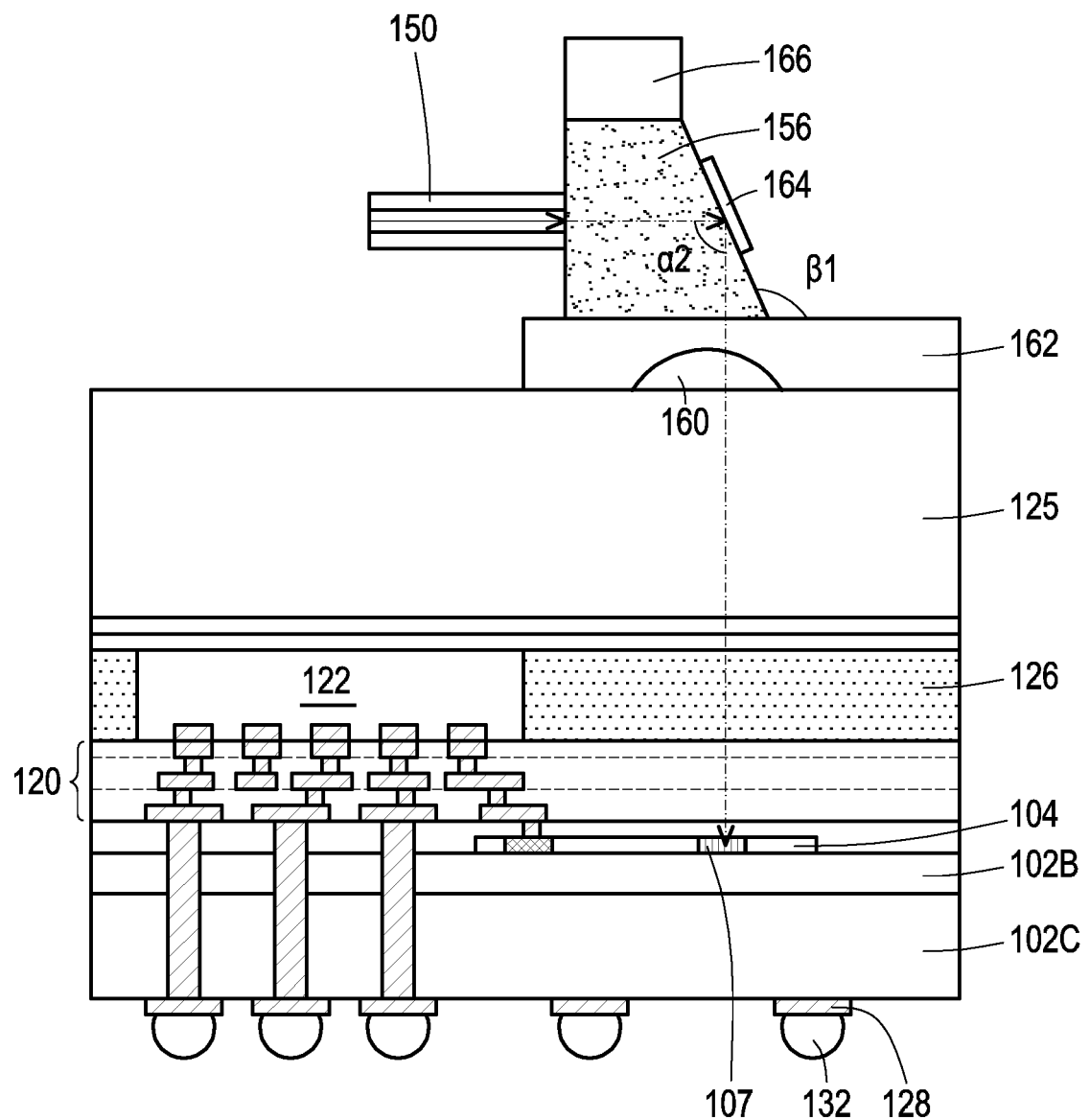

In FIG. 14D, an optical fiber 150 is laterally connected to a vertical sidewall of the prism 156 using a pick and place process that may utilize a passive alignment procedure. The prism 156 acts as an interface between the optical fiber 150 and the polymer layer 162 and is used to re-orient (e.g., vertically turn) the optical path of the optical signal from the optical fiber 150. In this way, the prism 156 allows optical communication between optical fiber 150 and coupler 107 (e.g., a grating coupler), formed in the waveguides 104. The prism 156 may re-orient the optical path of the optical signal from the optical fiber 150 by an angle α2, where the angle α2 is larger than 0°, and where the angle α2 is smaller than or equal to 90°. The reflector 164 on the sidewall of the prism 156 may be used to assist in re-orienting the optical signal from the optical fiber 150. In an embodiment, an angle β1 between the sidewall of the prism 156 used to re-orient the optical signal from the optical fiber 150 and the top surface of the polymer layer 162 may be larger than 90° and smaller than 180°.

Advantages can be achieved as a result of the formation of the prism 156 and the polymer micro lens 160 on top of the support substrate 125 of the photonic package 300. These advantages include the prism 156 supporting a re-orientation (e.g., vertically turning) of the optical path while still maintaining robustness of the optical fiber 150 with a lower susceptibility to optical fiber 150 breakage, and better tolerance and protection from particles falling on the micro lens 160. These particles may negatively affect optical communication. In addition, a wafer level process can be used to form the micro lens 160 that utilizes lithography that allows for higher throughput and alignment accuracy when forming the micro lens 160. Further, the use of the polymer micro lens 160 and the prism 156 and its topography allows for improved alignment of the optical path by allowing adjustments to be easily made to the optical path. Also, the use of the polymer micro lens 160 results in reduced alignment tolerances and a better spot size conversion with improved throughput (e.g., allowing for optical signals with larger wavelengths), which enables the photonic package 300 to be used in a broader range of applications such as virtual reality and augmented reality that require the ability to transmit optical signals that comprise larger wavelengths.

Figure 15A:
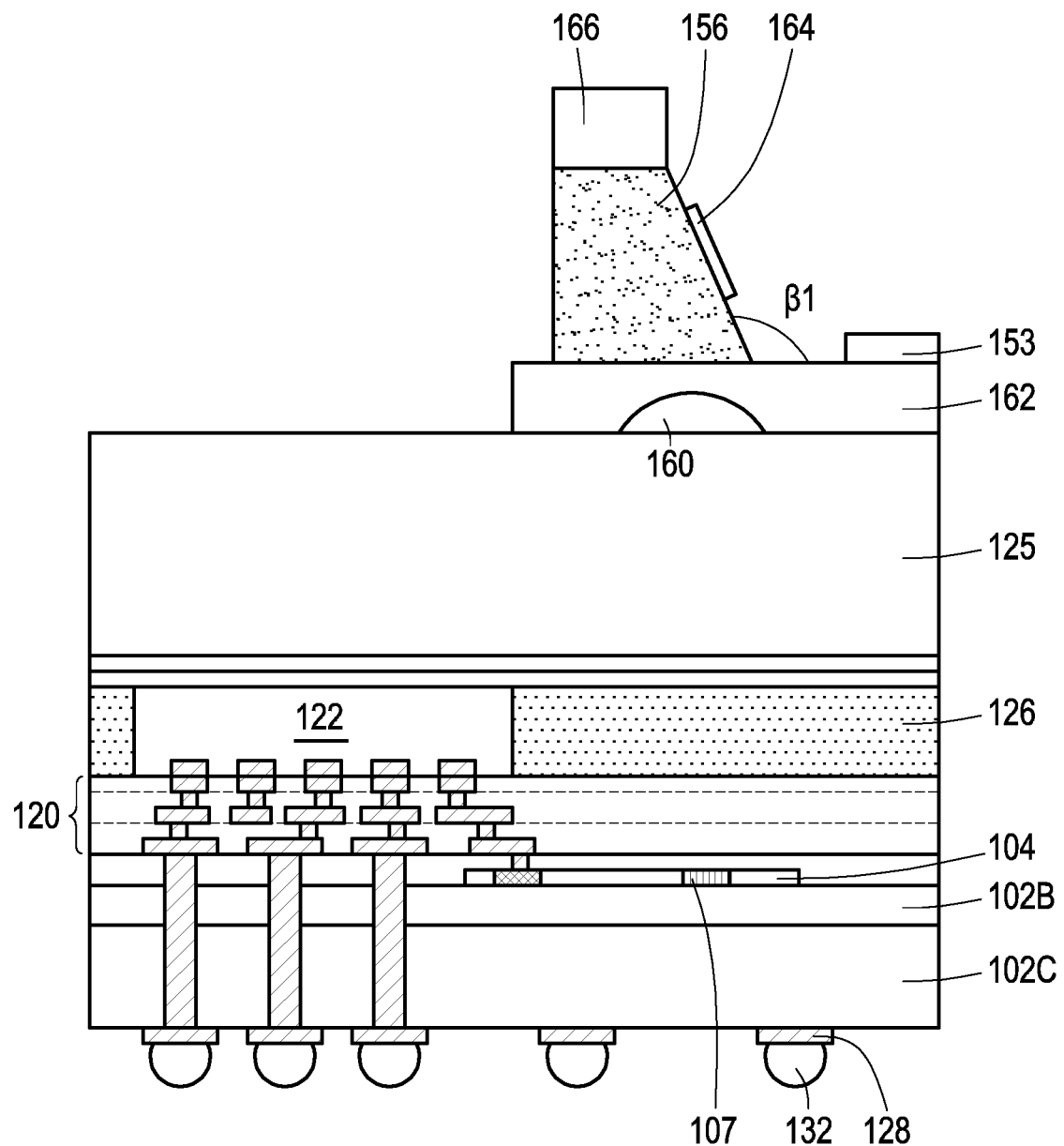
FIGS. 15A through 15C illustrate cross-sectional views of intermediate steps of forming a photonic package, in accordance with some embodiments.
Figure 15B:
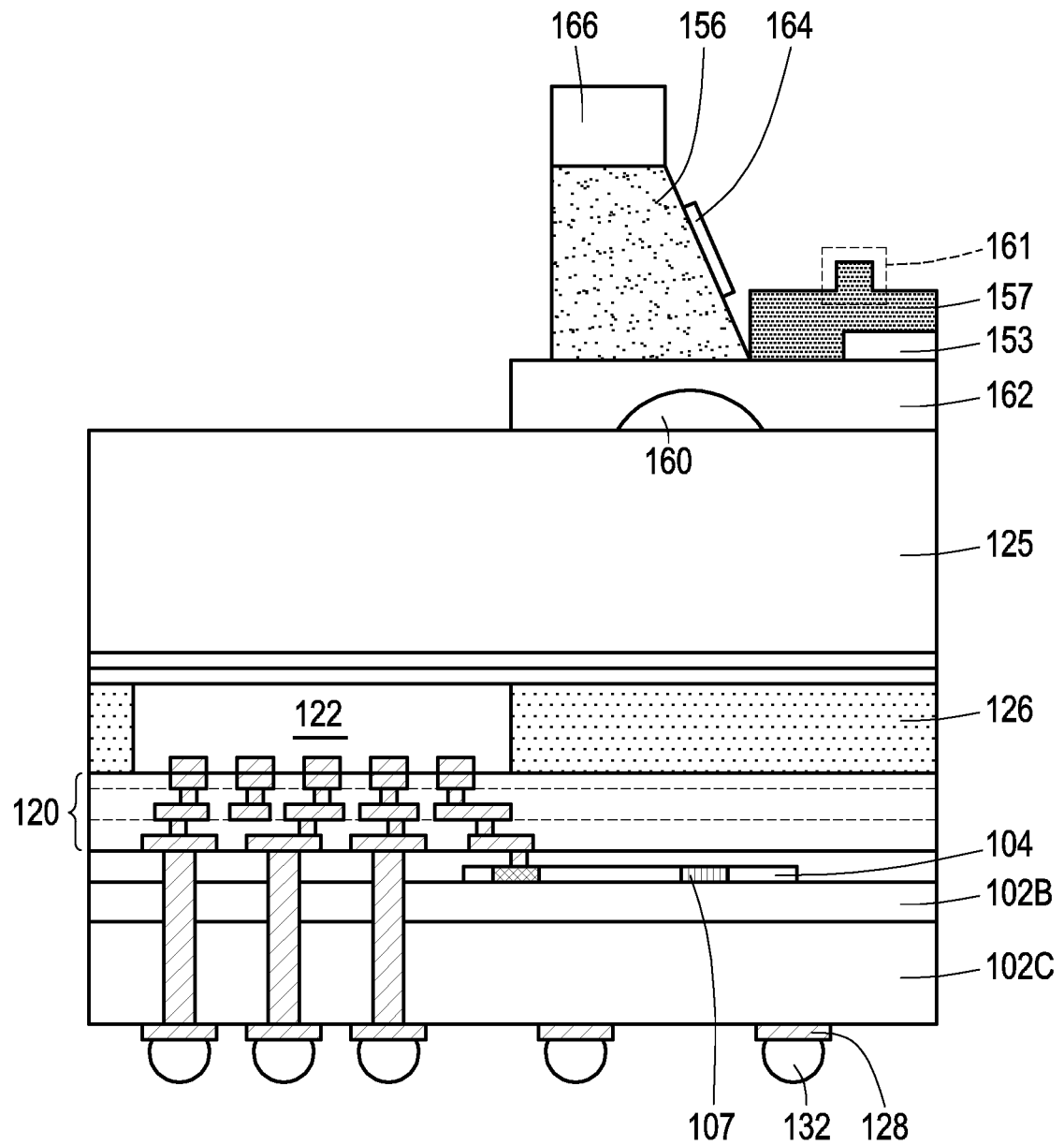
Figure 15C:
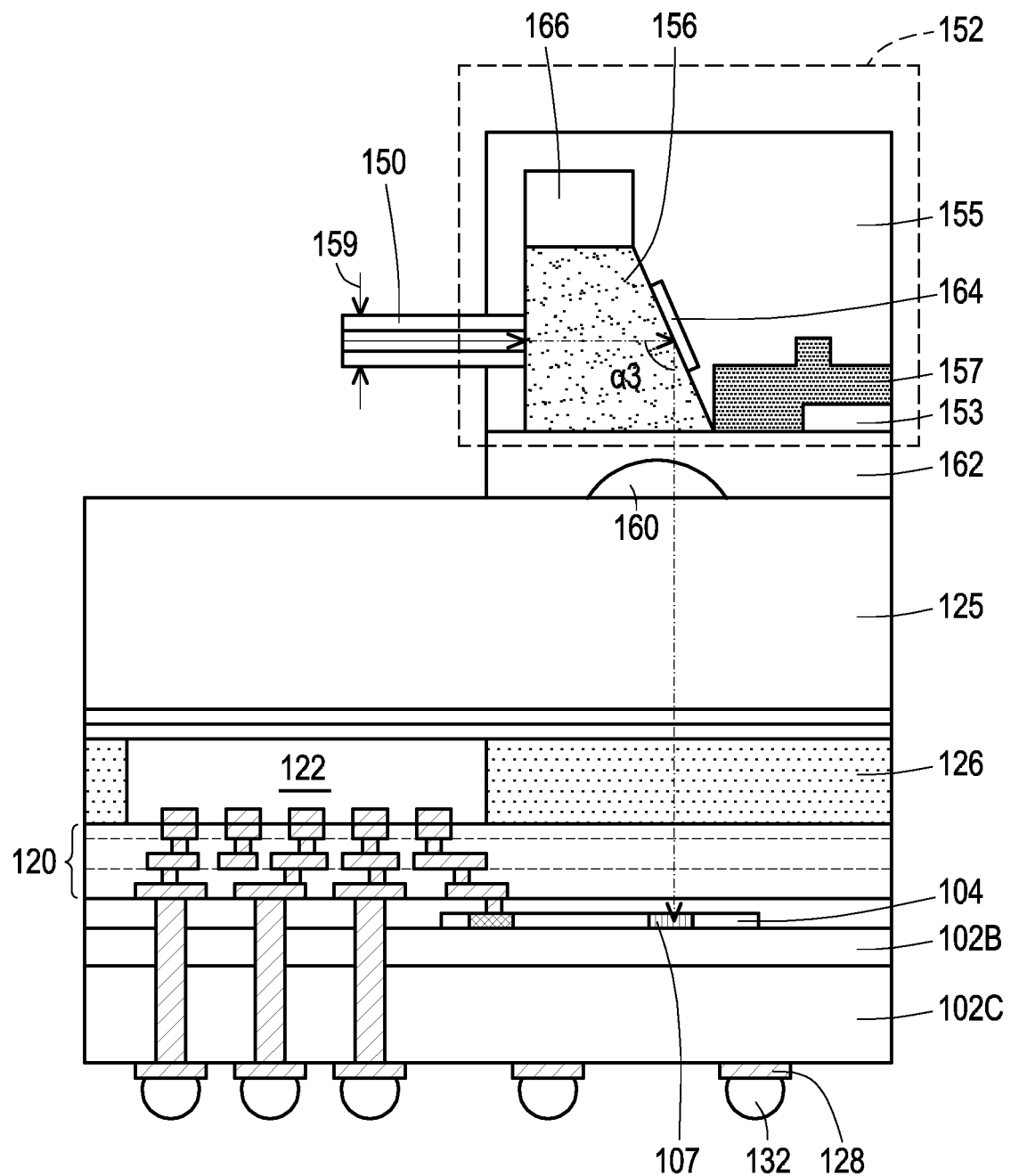

FIGS. 15A through 15C illustrate a photonic package 400, which may be similar to the photonic package 300 of FIGS. 1 through 14D where like reference numerals indicate like elements formed using like processes, unless specified otherwise. Accordingly, the process steps and applicable materials may not be repeated herein. The initial steps of this embodiment are essentially the same as shown in FIGS. 1 through 12 and FIGS. 14A through 14C.

In FIG. 15A, optical gel 153 may be optionally applied to the top surface of the polymer layer 160 of the structure shown in FIG. 14C, in order to aid in the subsequent attachment of a socket 157 to the top surface of the polymer layer 160 (shown in FIG. 15B below).

In FIG. 15B, the socket 157 is attached to the top surface of the polymer layer 160 using for example, a pick and place process. The socket 157 may comprise a guide-pin 161, allowing for a fiber holder 152 (shown subsequently in FIG. 15C) to be aligned, positioned, and attached to the socket 157 in relation to the guide-pin 161. The socket 157 and guide-pin 161 may be comprised of a thermally durable material such as polyethylene terephthalate (PET), high-density polyethylene (PE), polyvinyl chloride (PVC), acrylonitrile butadiene styrene (ABS), polymethyl methacrylate (PMMA), fiber-reinforced plastic (FRP), or the like.

In FIG. 15C, a fiber holder 152 is then coupled to the socket 157 and the polymer layer 160 using for example, a pick and place process, allowing the support substrate 125 to support the socket 157 and the fiber holder 152. The fiber holder 152 serves as a separable fiber attachment and allows optical communication between optical fiber 150 that is laterally connected to the fiber holder 152 and the coupler 107 (e.g., a grating coupler), formed in the waveguides 104. The fiber holder 152 may comprise a casing 155 that may be formed from a plastic or epoxy-based material. The prism 156 is used to re-orient (e.g., reflect and vertically turn) the optical path of the optical signal from the optical fiber 150. Accordingly, the optical path of light from the optical fiber 150 may be adjusted without physically bending the optical fiber 150, which improves robustness. The prism 156 may re-orient the optical path of the optical signal from the optical fiber 150 by an angle α3, where the angle α3 is larger than 0°, and the angle α3 is smaller than or equal to 90°.

The fiber holder 152 further includes a channel 159 located at the edge of the fiber holder 152 into which the optical fiber 150 may be inserted. The channel 159 secures the optical fiber 150 in a desired orientation, while still allowing the optical fiber 150 to be easily removed and/or repositioned. In an embodiment, the optical fiber 150 may also be attached to the fiber holder using a pick and place process that utilizes a passive alignment procedure.

Advantages can be achieved as a result of the formation of the fiber holder 152 and the polymer micro lens 160 over the top surface of the support substrate 125 of the photonic package 400, where the fiber holder 152 includes the prism 156. These advantages include the fiber holder 152 supporting a re-orientation (e.g., vertically turning) of the optical path while still maintaining robustness of the optical fiber 150 with a lower susceptibility to optical fiber 150 breakage, and better tolerance and protection from particles falling on the micro lens 160 than if no fiber holder 152 is used. These particles may negatively affect optical communication. In addition, a wafer level process can be used to form the micro lens 160 that utilizes lithography that allows for higher throughput and alignment accuracy when forming the polymer micro lens 160. Further, the use of the polymer micro lens 160 and the prism 156 and its topography allows for improved alignment of the optical path by allowing adjustments to be easily made to the optical path. Also, the use of the polymer micro lens 160 results in reduced alignment tolerances and a better spot size conversion with improved throughput (e.g., allowing for optical signals with larger wavelengths), which enables the photonic package 400 to be used in a broader range of applications such as virtual reality and augmented reality that require the ability to transmit optical signals that comprise larger wavelengths.

Figure 16:
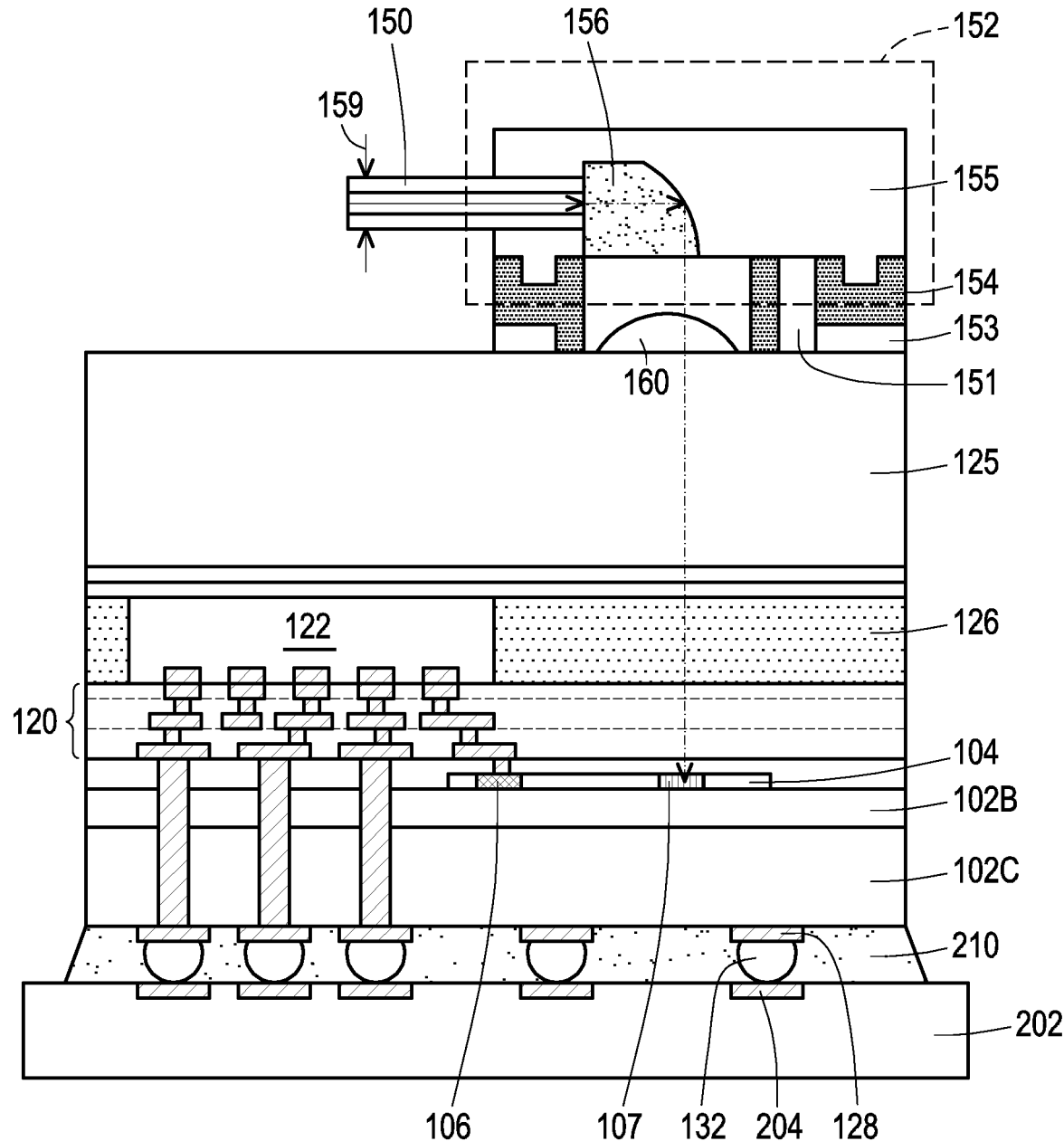
FIG. 16 illustrates a cross-sectional view of a photonic system, in accordance with some embodiments.

FIG. 16 illustrates a photonic system 500, in accordance with some embodiments. Though the photonic system 500 is shown as comprising a photonic package 100 attached to a substrate 202 in FIG. 16, the photonic system 500 may include one or more of any of the photonic packages 100/200/300/400 shown above in FIGS. 13A through 15C attached to the substrate 202. In some embodiments, the substrate 202 facilitates optical communication between the photonic packages 100/200/300/400 and external semiconductor devices, optical networks, or the like. In this manner, a photonic system 500 may combine semiconductor devices and photonic packages 100/200/300/400 on a single substrate 202 that allows for interfacing with one or more optical fibers 150.

The substrate 202 may be for example, a glass substrate, a ceramic substrate, a dielectric substrate, an organic substrate (e.g., an organic core), a semiconductor substrate (e.g., a semiconductor wafer), the like, or a combination thereof. In some embodiments, the substrate 202 includes conductive pads 204 and conductive routing (e.g., conductive lines, vias, redistribution structures, or the like). The substrate 202 may include passive or active devices, in some embodiments. In some embodiments, the substrate 202 may be another type of structure, such as an integrated fan-out structure (InFO), a redistribution structure, or the like. The conductive connectors 132 of the photonic package 100/200/300/400 may be bonded to the conductive pads 204 of the substrate 202, forming electrical connections between the photonic package 100/200/300/400 and the substrate 202. For example, the conductive connectors 132 of the photonic package 100/200/300/400 may be placed in physical contact with the conductive pads 204, and then a reflow process may be performed to bond solder material of the conductive connectors 132 to the conductive pads 204. In some embodiments, an underfill 210 may be formed between the photonic package 100/200/300/400 and the interconnect substrate 202.

In some embodiments, the photonic package 100/200/300/400 receives optical signals from an optical fiber 150 (e.g., at the coupler 107) which are detected using suitable photonic components 106. One or more electronic dies 122 in the photonic package 100/200/300/400 may then generate corresponding electrical signals based on the optical signals. The electronic dies 122 may also generate optical signals using suitable photonic components 106 and couple these optical signals into the optical fiber 150 (e.g., using the coupler 107).

Various embodiments provide methods of forming a package that includes both optical devices and electrical devices. In particular, the package includes one or more waveguides. A dielectric layer is formed over the waveguides and a support substrate is bonded to the dielectric layer. A separable fiber attachment and a polymer micro lens are formed on top of the support substrate. The separable fiber attachment includes a prism and the separable fiber attachment enables optical communication between optical fibers connected to the separable fiber attachment and one or more grating couplers formed in the waveguides. Advantageous features of one or more embodiments disclosed herein may include the use of the lateral separable fiber attachment which supports a re-orientation (e.g., vertically turning) of the optical path while still maintaining robustness of the optical fiber with a lower susceptibility to optical fiber breakage, and better tolerance and protection from particles falling on the polymer micro lens which may negatively affect optical communication. In addition, a wafer level process can be used to form the polymer micro lens that utilizes lithography that allows for higher throughput and alignment accuracy when forming the polymer micro lens. Further, the use of the polymer micro lens and the prism and its topography allows for improved alignment of the optical path by allowing adjustments to be easily made to the optical path. Also, the use of the polymer micro lens results in reduced alignment tolerances and a better spot size conversion with improved throughput (e.g., allowing for optical signals with larger wavelengths), which enables the package to be used in a broader range of applications such as virtual reality and augmented reality that require the ability to transmit optical signals that comprise larger wavelengths.

In accordance with an embodiment, a package includes a photonic layer on a substrate, the photonic layer including a silicon waveguide coupled to a grating coupler; an interconnect structure over the photonic layer; an electronic die and a first dielectric layer over the interconnect structure, where the electronic die is connected to the interconnect structure; a first substrate bonded to the electronic die and the first dielectric layer; a socket attached to a top surface of the first substrate; and a fiber holder coupled to the first substrate through the socket, where the fiber holder includes a prism that re-orients an optical path of an optical signal. In an embodiment, the package further includes a micro lens attached to the top surface of the first substrate. In an embodiment, the micro lens includes a polymer. In an embodiment, the package further includes a guide-pin attached to the top surface of the first substrate. In an embodiment, a material of the guide-pin and a material of the micro lens is the same. In an embodiment, the first substrate includes silicon. In an embodiment, the socket includes polyethylene terephthalate (PET) or polyvinyl chloride (PVC). In an embodiment, the prism includes a polymer.

In accordance with an embodiment, a package includes a silicon waveguide on a substrate, the silicon waveguide comprising a first grating coupler; a semiconductor device and a first dielectric layer over the silicon waveguide; a first substrate bonded to the semiconductor device and the first dielectric layer; a fiber holder coupled to the first substrate, the fiber holder comprising a prism; and a channel in the fiber holder configured to hold an optical fiber that is optically coupled to the first grating coupler, wherein the prism is configured to re-orient an optical path of an optical signal from the optical fiber. In an embodiment, the first substrate is bonded to the semiconductor device and the first dielectric layer using a dielectric-to-dielectric bond. In an embodiment, the package further includes a socket that couples the fiber holder to the first substrate. In an embodiment, the package further includes a micro lens between the fiber holder and the silicon waveguide. In an embodiment, the micro lens is disposed in a cavity between inner sidewalls of the socket, a top surface of the first substrate, and a bottom surface of the fiber holder. In an embodiment, the first substrate has a thickness that is in a range from 10 μm to 10000 μm. In an embodiment, the package further includes vias extending through the substrate, wherein the vias are electrically connected to the semiconductor device.

In accordance with an embodiment, a method includes patterning a silicon layer to form a waveguide; forming a plurality of photonic components in the waveguide; forming an interconnect structure over the waveguide and the plurality of photonic components; bonding a semiconductor device to the interconnect structure; forming a dielectric layer on the interconnect structure and surrounding the semiconductor device; bonding a first substrate to the dielectric layer and the semiconductor device; and coupling a prism to the first substrate. In an embodiment, the plurality of photonic components includes at least one grating coupler. In an embodiment, the method further includes forming a micro lens on a top surface of the first substrate; and forming a polymer layer over and around the micro lens, where the polymer layer and the micro lens is disposed between the prism and the first substrate. In an embodiment, the micro lens includes a polymer. In an embodiment, the method further includes coupling a fiber holder to the first substrate, where the fiber holder is configured to hold an optical fiber that is optically coupled to at least one photonic component of the plurality of photonic components.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A package comprising:
   a waveguide and a coupler on a first side of a first substrate;
   an electronic die embedded in a first dielectric layer, the electronic die and the first dielectric layer being disposed over the first substrate, the waveguide and the coupler;

a second substrate over and bonded to top surfaces of the electronic die and the first dielectric layer;
socket coupled to a top surface of the second substrate, wherein inner sidewalls of the socket form a cavity; and
a microlens disposed on the top surface of the second substrate and in the cavity.

2. The package of claim 1, further comprising an interconnect structure on the first side of the first substrate, wherein the first substrate comprises conductive vias extending from the interconnect structure to a second side of the first substrate.

3. The package of claim 1, further comprising a fiber holder attached to the socket, the fiber holder comprising a casing and a prism, the fiber holder covering the cavity and the microlens.

4. The package of claim 3, further comprising a void between the microlens and the fiber holder.

5. The package of claim 3, wherein the prism is an arc prism.

6. The package of claim 1, further comprising a pin disposed on the top surface of the second substrate, wherein the socket comprises a recess, wherein the pin protrudes into the recess.

7. The package of claim 6, wherein the pin and the microlens are formed of a same material.

8. A package comprising:
a first substrate having an optical coupler;
an electronic die bonded to the first substrate, the electronic die being laterally offset from the optical coupler;
a first dielectric layer over the first substrate and along sidewalls of the electronic die;
a second substrate having a first side and a second side, the first side of the second substrate being bonded to the electronic die; and
a lens on the second side of the second substrate, wherein the lens is aligned with the optical coupler.

9. The package of claim 8, wherein the second substrate extends over the first dielectric layer.

10. The package of claim 8, further comprising:
a socket on the second side of the second substrate, the socket having a cavity, the lens being within the cavity.

11. The package of claim 10, further comprising:
a pin protruding from the second side of the second substrate, wherein the pin extends into an opening in the socket.

12. The package of claim 11, wherein a material of the pin and a material of the lens are the same.

13. The package of claim 10, further comprising:
a casing attached to the socket, the casing being configured to couple to an optical fiber.

14. The package of claim 13, wherein the casing includes a prism aligned with the lens.

15. A method comprising:
coupling a semiconductor die to a first wafer, the first wafer comprising a substrate, a photonic structure over the substrate, and an interconnect structure over the substrate;
depositing a first dielectric layer over the first wafer, the first dielectric layer covering sidewalls of the semiconductor die;
attaching a second substrate to a top surface of the semiconductor die and a top surface of the first dielectric layer; and
forming a lens over a top surface of the second substrate.

16. The method of claim 15, wherein the photonic structure comprises a grating coupler and a waveguide.

17. The method of claim 15, further comprising:
forming a pin over the top surface of the second substrate, wherein the pin and the lens are formed of a same material.

18. The method of claim 17, further comprising:
attaching a socket to the second substrate, the socket fitting over the pin, the socket having a cavity, the cavity being aligned with the lens.

19. The method of claim 18, further comprising:
attaching a casing to the socket, wherein the socket comprises a prism, wherein the casing includes a protrusion that extends into a recess in the socket.

20. The method of claim 19, wherein the casing covers the cavity.

* * * * *